(12) United States Patent
Long

(10) Patent No.: US 6,547,628 B1
(45) Date of Patent: Apr. 15, 2003

(54) ELECTRONIC LEARNING TOY

(75) Inventor: Jennifer Long, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 09/969,180

(22) Filed: Oct. 3, 2001

(51) Int. Cl.[7] ............................................. A63H 33/00
(52) U.S. Cl. ...................... 446/227; 446/175; 446/484; 446/489
(58) Field of Search ................................ 446/175, 227, 446/297, 404, 484, 489, 491; 439/258, 259, 260, 335; D21/468, 470–471, 475

(56) References Cited

U.S. PATENT DOCUMENTS

| | | |
|---|---|---|
| 3,508,349 A | 4/1970 | Gilden et al. |
| 4,306,716 A | 12/1981 | James et al. |
| 4,322,074 A | 3/1982 | James et al. |
| 4,448,417 A | 5/1984 | Clark et al. |
| 4,621,443 A | 11/1986 | Weinreich |
| 5,055,053 A | 10/1991 | Hyman |
| 5,392,140 A | 2/1995 | Ezra et al. |
| 5,465,175 A | 11/1995 | Woodgate et al. |
| 5,478,240 A | 12/1995 | Cogliano |
| 5,732,999 A * | 3/1998 | Petrie .......................... 297/136 |
| 5,813,861 A * | 9/1998 | Wood ........................... 434/169 |
| 5,851,119 A | 12/1998 | Sharpe, III et al. |
| D460,127 S * | 7/2002 | Long .......................... D21/475 |

* cited by examiner

Primary Examiner—S. Thomas Hughes
Assistant Examiner—Alex F. R. P. Rada, II
(74) Attorney, Agent, or Firm—Fish & Richardson P.C.

(57) ABSTRACT

A toy includes a housing, an output device, an input device, an overlay, and a controller. The housing has a surface and the output device is mounted to the housing. The input device is mounted in a first area on the surface to receive input. The overlay is mounted on the surface to receive input. The overlay moves relative to the surface from a second area to the first area such that the overlay is disengaged from the input device when the overlay is in the second area and the input device is engaged by the overlay when the overlay is in the first area. The controller is connected to the input device and to the output device. The controller controls the output device to perform a first action when the input device receives input and the overlay is in the second area and to perform a second action when the input device receives input and the overlay is in the first area.

34 Claims, 26 Drawing Sheets

ELECTRONIC LEARNING TOY

TECHNICAL FIELD

This invention relates to an electronic learning toy.

BACKGROUND

Electronic learning toys are well known, and may be used, for example, to teach young children.

SUMMARY

In one general aspect, a toy includes a housing, an output device, an input device, an overlay, and a controller. The housing has a surface and the output device is mounted to the housing. The input device is mounted in a first area on the surface to receive input. The overlay also is mounted on the surface to receive input. The overlay moves relative to the surface from a second area to the first area such that the overlay is disengaged from the input device when the overlay is in the second area and the overlay engages the input device when the overlay is in the first area. The controller is connected to the input device and to the output device. The controller controls the output device to perform a first action when the input device receives input and the overlay is in the second area and to perform a second action when the input device receives input and the overlay is in the first area.

Implementations may include one or more of the following features. For example, the toy may include a switch mounted to the housing and engaged by the overlay when the overlay is in the first area. The switch may be connected to the controller to indicate whether the overlay is in the first area.

The output device may include a display. The input device and the overlay each may include a button.

The toy may include another output device mounted to the housing and connected to the controller. The input device may include a physical characteristic and the overlay may include a physical characteristic such that the first action relates to the physical characteristic of the input device and the second action relates to the physical characteristic of the overlay.

The toy may include a second overlay mounted on the surface to receive input and to move relative to the surface from a third area in which the second overlay is disengaged from the input device to the first area in which the second overlay is engaged with the input device to provide input to the input device when the second overlay receives input. The controller may control the output device to perform a third action when the second overlay receives input and the second overlay is in the first area.

The toy may further include a second switch mounted to the housing and engaged by the second overlay when the second overlay is in the first area. The second switch may be connected to the controller to indicate whether the second overlay is in the first area. The second overlay may include a button. The second overlay may include a physical characteristic such that the third action relates to the second overlay's physical characteristic.

The toy may also include another input device mounted to the housing. The other input device is disengaged from the overlay independently of whether the overlay is in the first area. The controller may be connected to the other input device to receive input from the other input device, to cause the output device to perform a fourth action when the other input device receives input and the overlay is in the second area, and to cause the output device to perform a fifth action when the other input device receives input and the overlay is in the first area.

The output device may include an array of light sources, a grid placed over the array, and a diffuser. The grid includes an array of tubular holes, with each hole aligning with a light source when the grid is placed over the array. The diffuser is placed over the grid to collect light emitted from the light sources.

The grid may be made of a rigid plastic material. Each of the holes may have a white surface. The grid may have a thickness that is greater than a height of the array such that an area of light projected from the array and onto the diffuser is enlarged. The diffuser may diffuse light emitted from the light sources. The diffuser may mask the light sources. The diffuser may be made of an acetate material. The diffuser may include at least a portion covered with an opaque coating. The diffuser may be made of a milky and translucent material.

In another general aspect, an electronic learning toy that includes a housing having a surface and an output device mounted to the housing is controlled by providing an input device and providing an overlay mounted on the surface. The input device is mounted on the surface at a first area. The overlay moves relative to the surface from a second area in which the overlay is disengaged from the input device to the first area in which the overlay engages the input device. Input is received from the input device, and a determination is made as to whether the overlay is in the first area. If the overlay is not in the first area, a signal is sent to the output device to cause the output device to perform a first action. If the overlay is in the first area, a signal is sent to the output device to cause the output device to perform a second action.

Implementations may include one or more of the following features. For example, determining whether the overlay is in the first area may include receiving an indication of whether the overlay is in the first area from a switch mounted to the housing and engaged by the overlay when the overlay is in the first area.

The method may further include providing a second overlay mounted on the surface to move relative to the surface from a third area in which the second overlay is disengaged from the input device to the first area in which the input device is engaged by the second overlay. Furthermore, the method may include determining whether the second overlay is in the first area. If the second overlay is in the first area, the method may include sending a signal to the output device to perform a third action. Alternatively, if neither the overlay nor the second overlay is in the first area, the method may include sending a signal to the output device to perform the first action. Determining whether the second overlay is in the first area may include receiving an indication of whether the second overlay is in the first area from a second switch mounted to the housing and engaged by the second overlay when the second overlay is in the first area.

Other features and advantages will be apparent from the description, the drawings, and the claims.

DESCRIPTION OF DRAWINGS

Like reference symbols in the various drawings indicate like elements.

DETAILED DESCRIPTION

Figure 1:
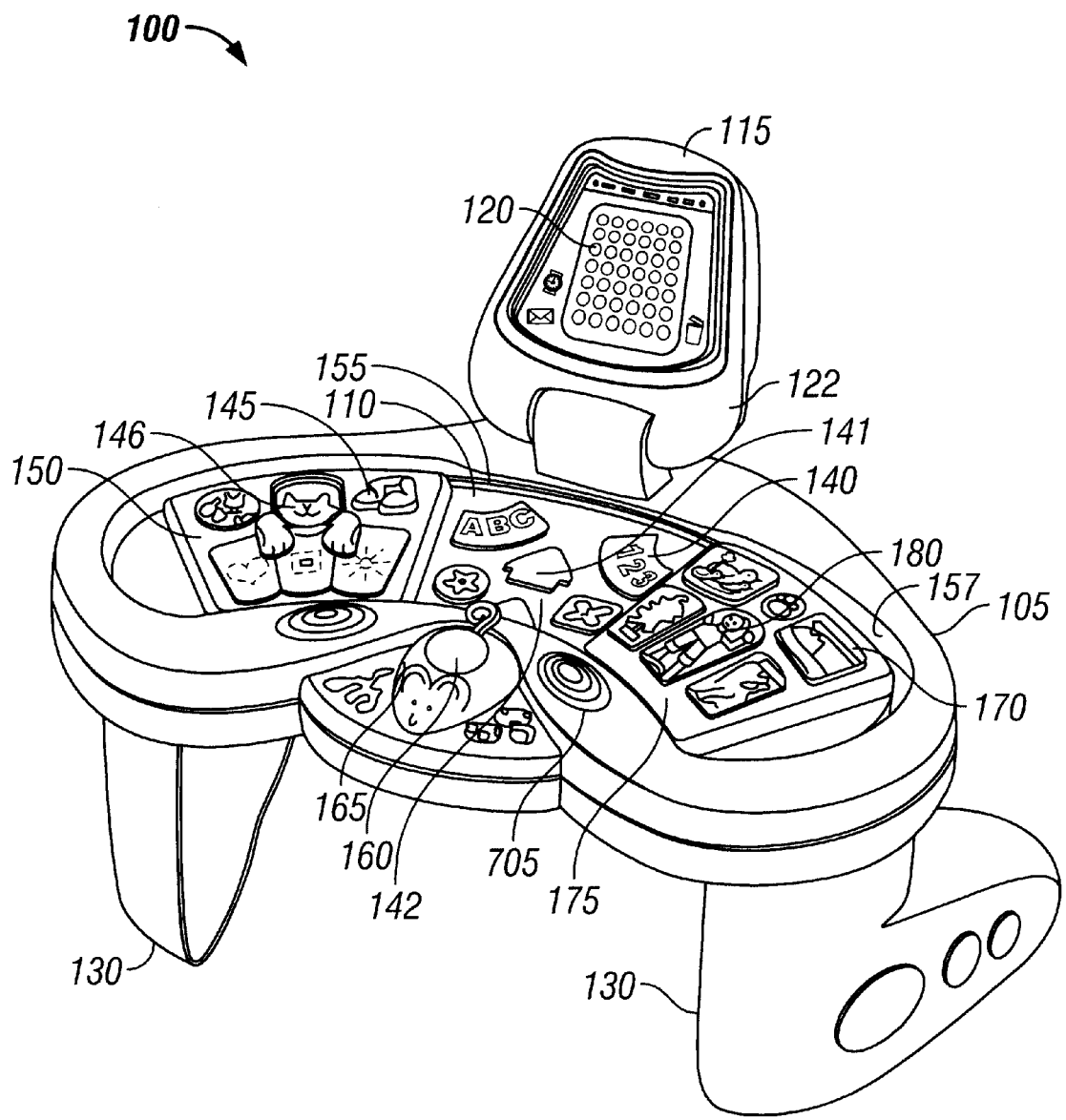
FIG. 1 is a perspective front view of an electronic learning toy.
Figure 2:
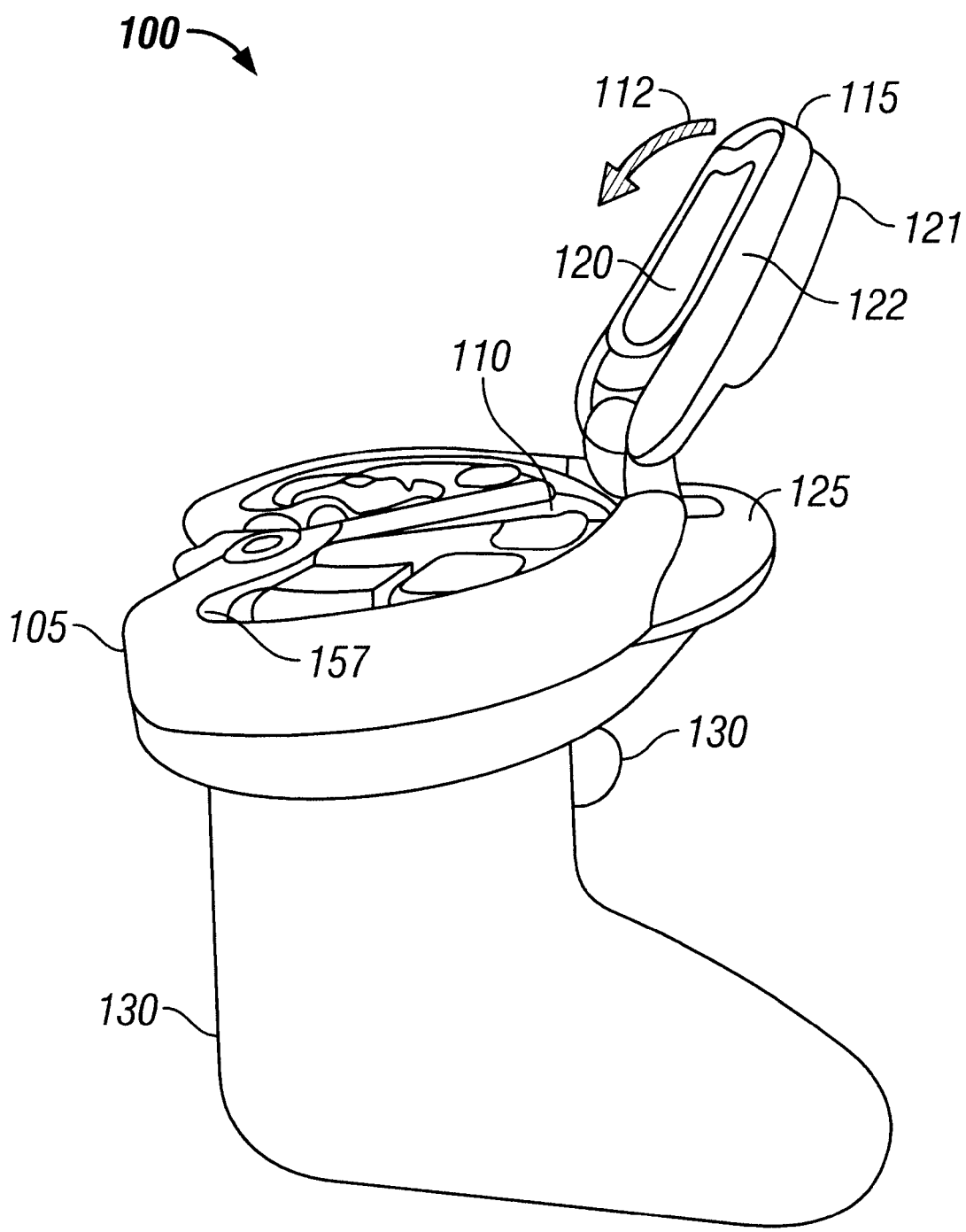
FIG. 2 is a perspective side view of the toy of FIG. 1.
Figure 3:
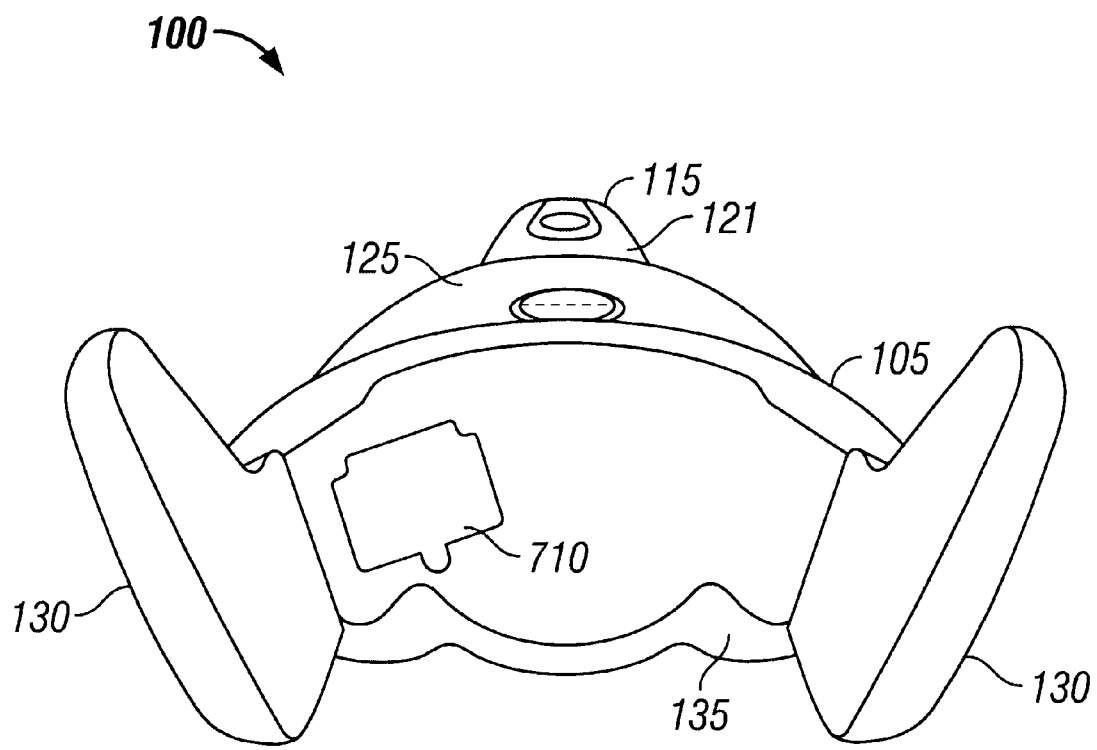
FIG. 3 is a perspective lower view of the toy of FIG. 1.
Figure 4:
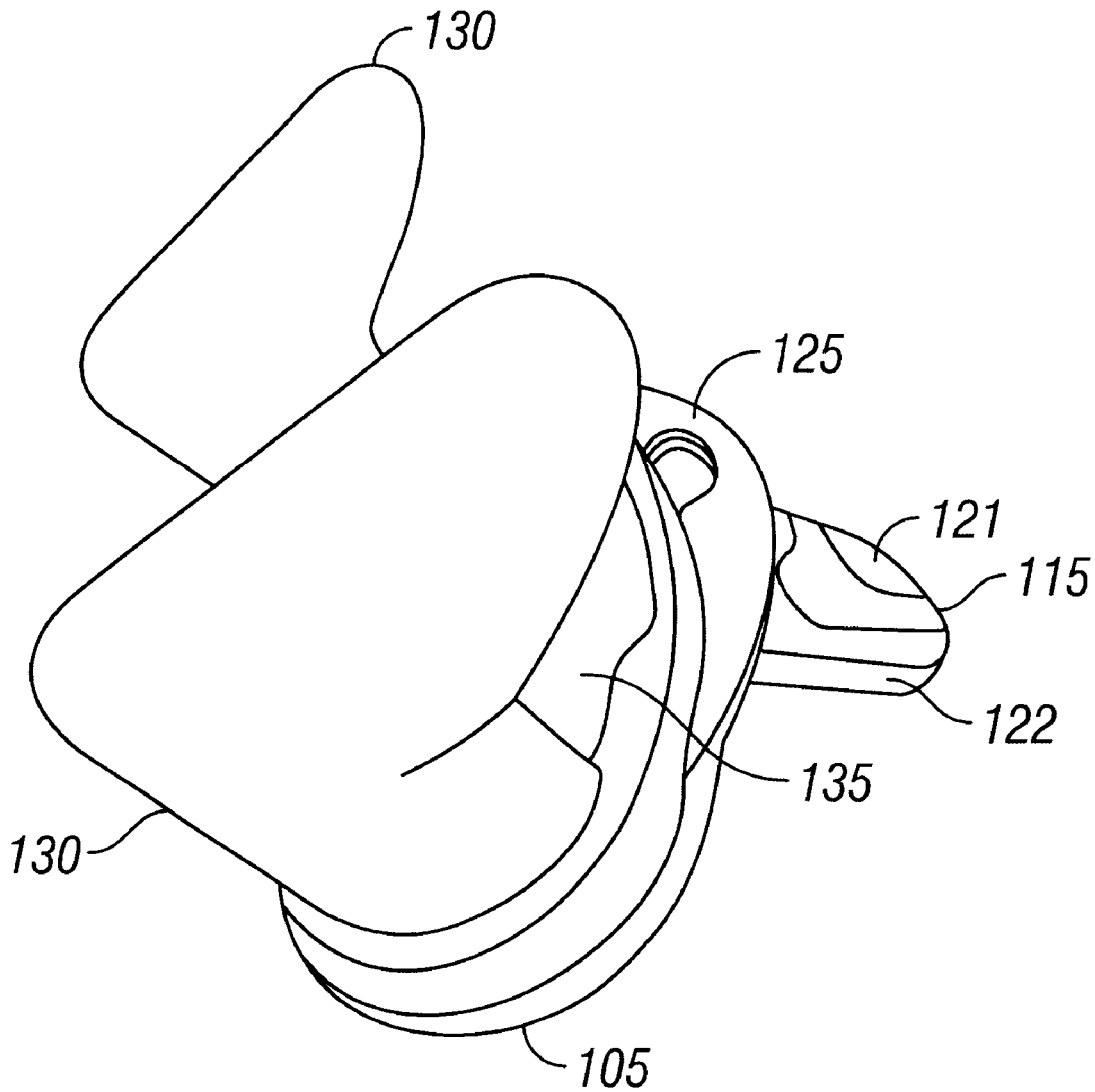
FIG. 4 is a perspective lower diagonal view of the toy of FIG. 1.

Referring to FIGS. 1–4, an electronic learning toy 100 includes a housing 105 having a surface 110, and an output device 115 mounted to the housing 105. The output device 115 may be attached to the housing 105 to fold down onto the surface 110 when not in use (as depicted by arrow 112 in FIG. 2), thus preventing breakage and facilitating carriage and storage of the toy 100. The output device 115 may be any device that produces one or more actions. For example, as shown in FIGS. 1–4, the output device 115 includes a display 120. The output device 115 may be made of a base piece 121 and a frame piece 122 that are attached together to form an internal cavity that holds components such as the display 120. The display 120 may include a liquid crystal display (LCD) or an array of light emitting diodes (LEDs) (as shown in FIGS. 1–4) arranged to operate to provide various visual illustrations.

The housing 105 may be made of a rigid plastic material and formed of either a single piece or several pieces that fit together to form a hollow volume to house, for example, electronic components. The housing 105 may be formed using any suitable technique, such as, for example, injection molding, into any suitable design. The housing 105 may include a handle 125 that protrudes from a side of the housing 105 to facilitate carriage of the toy 100.

The housing 105 may also include legs 130 that protrude from a lower side 135 of the housing 105 opposite the surface 110. The legs 130 may be detachable from the housing to facilitate use, carriage, and storage of the toy 100. For example, the legs 130 may be removed when the toy 100 is placed on a table or when the toy 100 is being transported, and the legs 130 may be attached when the toy 100 is placed on the floor. The legs 130 may be integral to the housing 105. The legs 130 may be formed of any suitable rigid material such as plastic. In any case, the legs 130 may be used to support the housing 105 and to create a desk-like appearance and design.

The toy 100 also includes an input device 140 attached to the surface 110 to receive input from a user to control operation of the toy 100. The input device 140 may be formed as a depressible button shaped to fit into a hole formed in the surface 110. The depressible button may be a spring-loaded button that contacts or activates a switch within the housing when pressed. The input device 140 may have characteristics, such as, for example, shape, color, and illustration, that correlate to the actions produced by the output device 115 when the input device 140 receives input. For example, as shown in FIG. 1, the input device 140 is shaped like an arc and has a surface on which numbers are illustrated. The input device 140 is generally located within a first area 142, as shown in FIG. 1.

Figure 5:
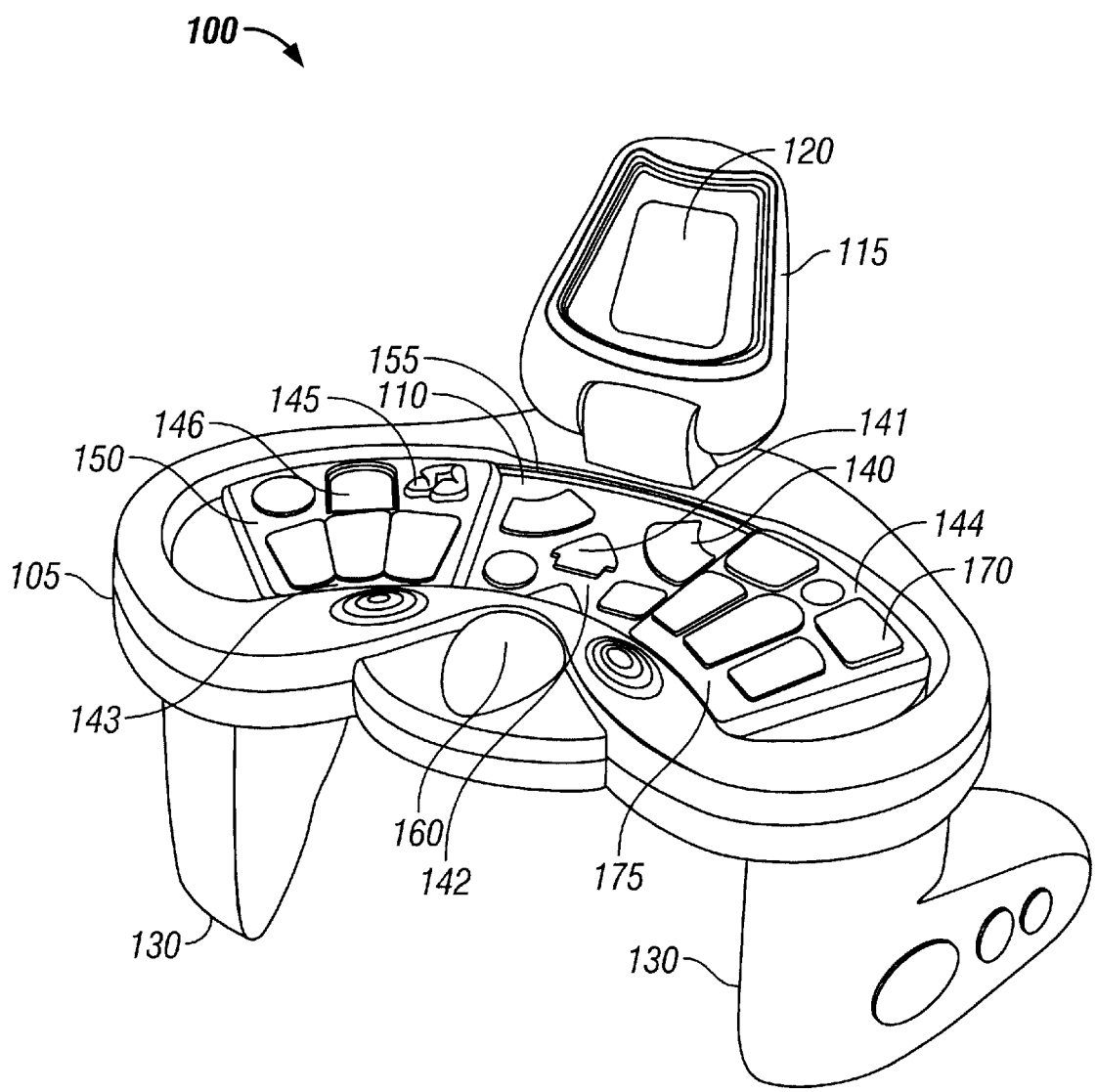
FIGS. 5 and 6 are perspective front views of the toy of FIG. 1.
Figure 6:
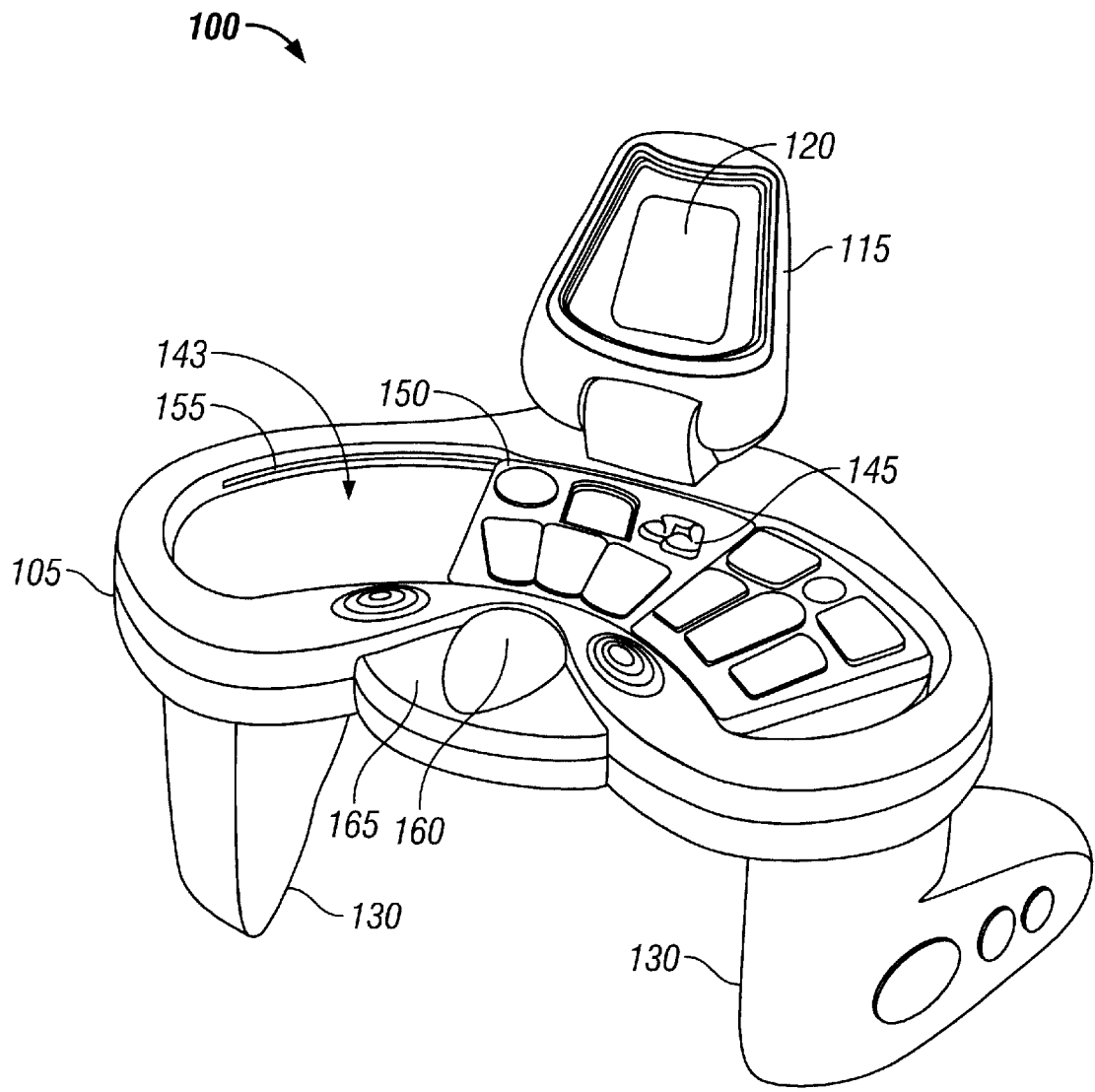

Referring also to FIGS. 5 and 6, the toy 100 also includes an overlay 145 attached to the surface 110 to move relative to the surface 110 from a second area 143 to the first area 142 and to receive input from a player. When the overlay 145 is in the second area, the input device 140 is disengaged from the overlay 145 such that input received by the overlay 145 does not provide input to the input device 140. When the overlay 145 is positioned in the first area, the input device 140 is engaged by the overlay 145 such that input received by the overlay 145 provides input to the input device 140. The overlay 145 matches or lines up with the input device 140 when the overlay 145 is in the first area to permit the overlay 145 to engage the input device 140.

In one implementation, the overlay 145 includes a spring-loaded button having an extension such as a post. The post is positioned to contact the input device 140 when the player presses the overlay 145 when the overlay 145 is in the first area. In another implementation, the overlay 145 may couple to a shaft that rotates in response to the overlay 145 being pressed. Arms may extend from the shaft to engage resilient members that extend to a post positioned to contact the input device 140 when the user presses the overlay 145 when the overlay 145 is in the first area.

In another implementation, the overlay 145 may couple to a plunger that is positioned to contact the input device 140 when the user presses the overlay 145 when the overlay 145 is in the first area. In another implementation, the overlay 145 may couple to a flexible, resilient material such as silicon rubber that is positioned to contact the input device 140 when the user presses the overlay 145 when the overlay 145 is in the first area.

In a further implementation, the overlay 145 may engage the input device 140 using a pneumatic bellows.

The overlay 145 may be formed as a button having characteristics, such as, for example, shape, color, and illustration, that correlate to the actions produced by the output device 115 when the input device 140 receives input from the overlay 145. As shown, for example, the overlay 145 is shaped like a musical note.

The overlay 145 may be attached to and supported by a movable piece 150. The movable piece 150 is engaged by the housing 105 to slide along the surface 110. The movable piece 150 may include flanges that engage slots or tracks 155 formed along sides 157 that protrude from the surface 110 of the housing 105. The tracks 155 may be formed along opposite sides of the surface 110 to provide greater stability.

Additionally, the toy 100 may include several other input devices of different shapes and several other overlays of different shapes, with each overlay matching or lining up with a corresponding input device when that overlay is moved to the first area. For example, an input device 141 is shaped like an arrow and an overlay 146 is shaped like a cat.

The overlay 146 lines up with the input device 141 when the overlay 146 is in the first area.

The toy 100 may further include another input device 160 attached to an outer ledge 165 of the housing 105 to receive input from a player to control operation of the toy 100. As shown, the input device 160 may be formed as a depressible trackball shaped to fit into the ledge 165. The input device 160 may be positioned such that the overlay 145 is prevented from engaging the input device 160 at any position along the surface 110.

Figure 7:
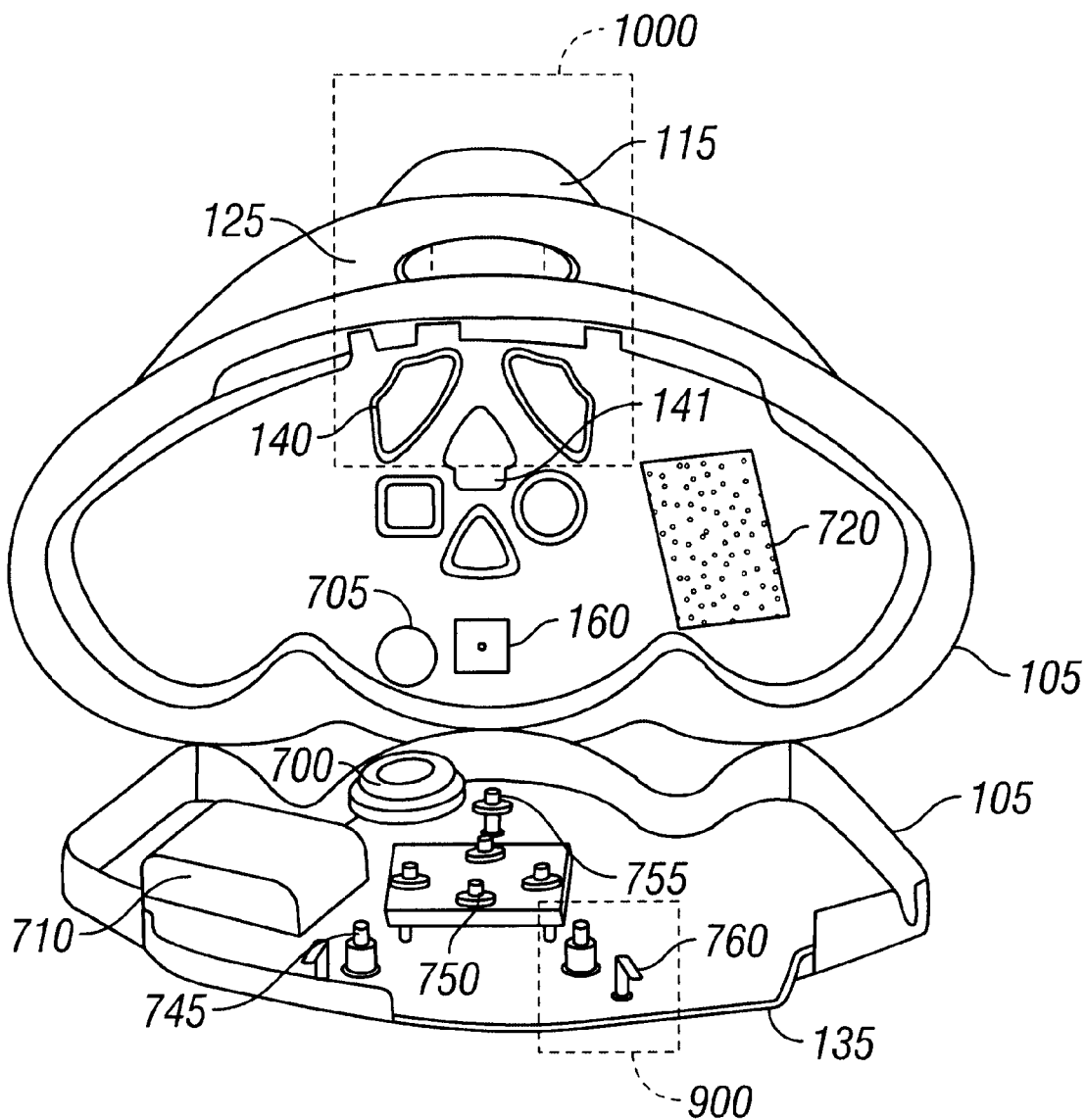
FIG. 7 is a perspective view of the toy of FIG. 1 disassembled to show internal components.
Figure 8A:
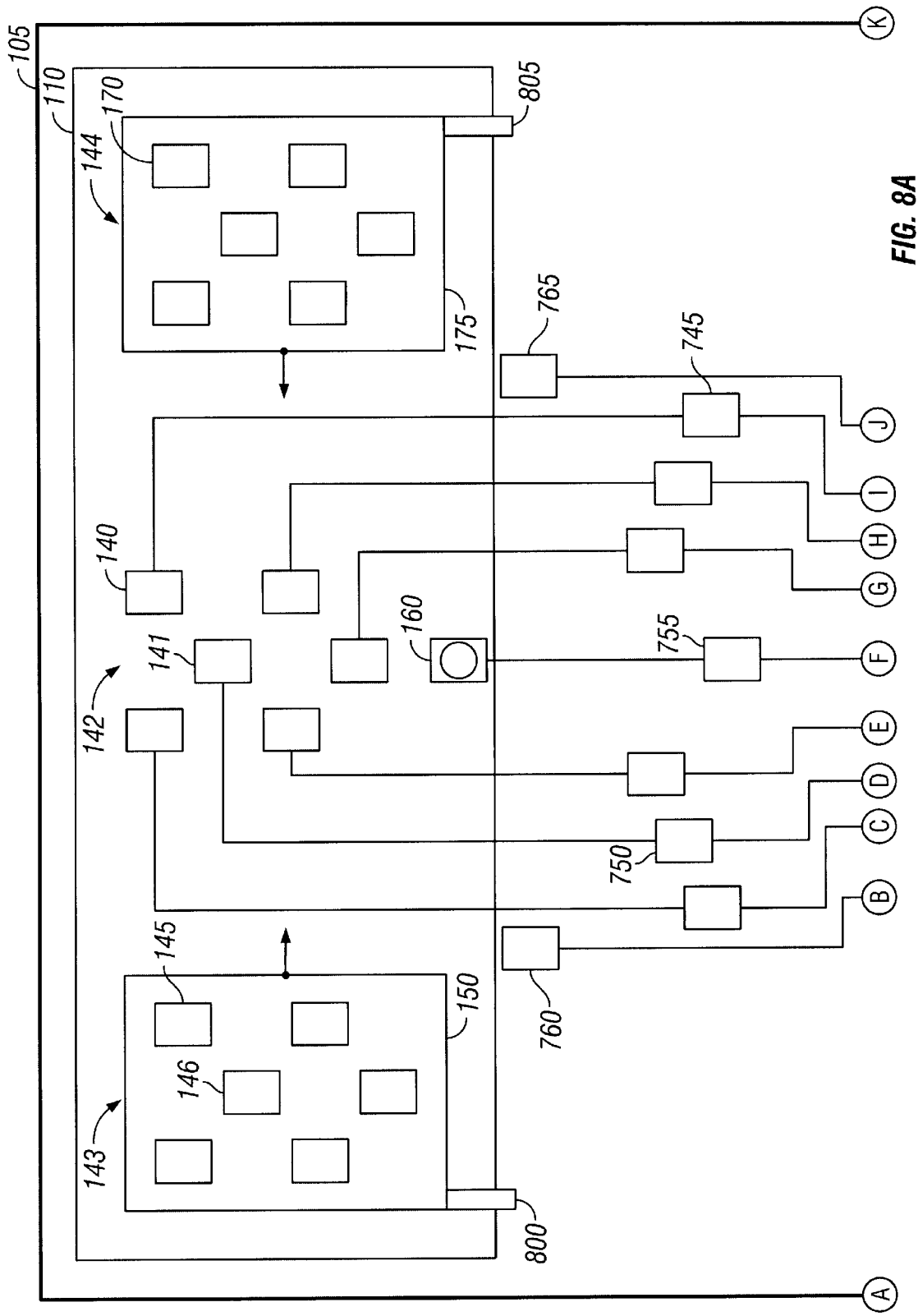
FIG. 8 is a block diagram of the toy of FIG. 1.
Figure 8B:
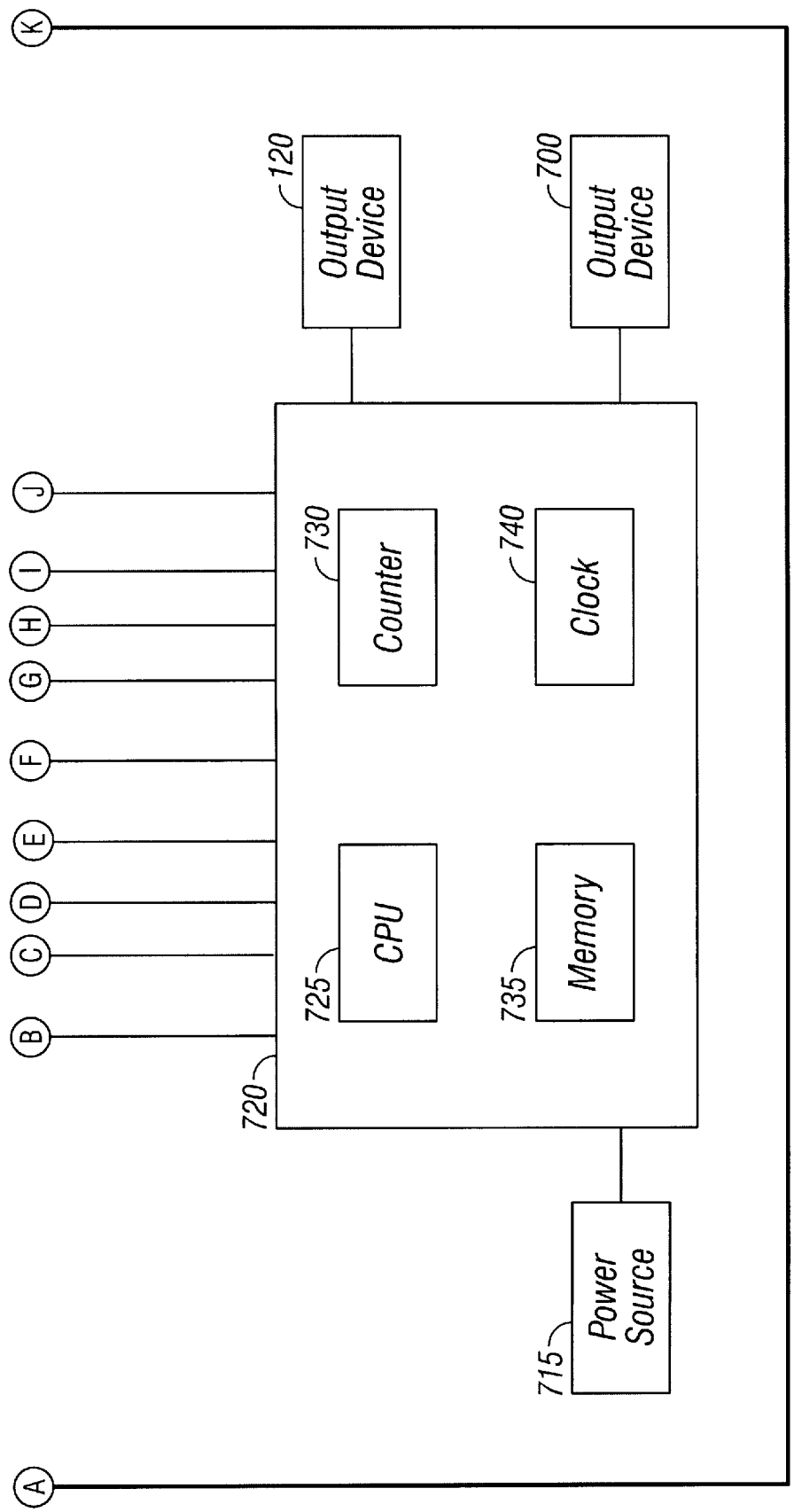

Referring also to FIGS. 7 and 8, the toy 100 may include another output device 700 that operates to perform actions in conjunction with operation of the output device 115. In one implementation, the output device 700 includes an audio device such as a speaker that plays one or more sounds that relate to the visual illustrations produced by the display 120. Additionally, one or more openings 705 may be formed on the housing 105 and positioned relative to the speaker to permit the audio output to emanate from the speaker without being muffled by the housing 105.

The toy 100 may include a compartment 710 for housing a power source 715 such as a battery. The compartment 710 may be opened and closed using, for example, a screwdriver or snap-fit feature.

The toy 100 also includes a controller 720 that operates or causes the output device 115 or 700 to perform actions. The controller 720 may operate based on information from a processor 725, a counter 730, a memory 735, and/or a clock 740. The controller 720 is connected to the power source 715 to receive power. Additionally, the controller 720 is connected to a switch 745 that is activated when the input device 140 receives input. The controller 720 also is connected to any other switches connected to input devices formed on the housing 105. Thus, for example, the controller 720 is connected to a switch 750 that is activated by the input device 141 and a switch 755 that is activated by the input device 160.

Figure 9:
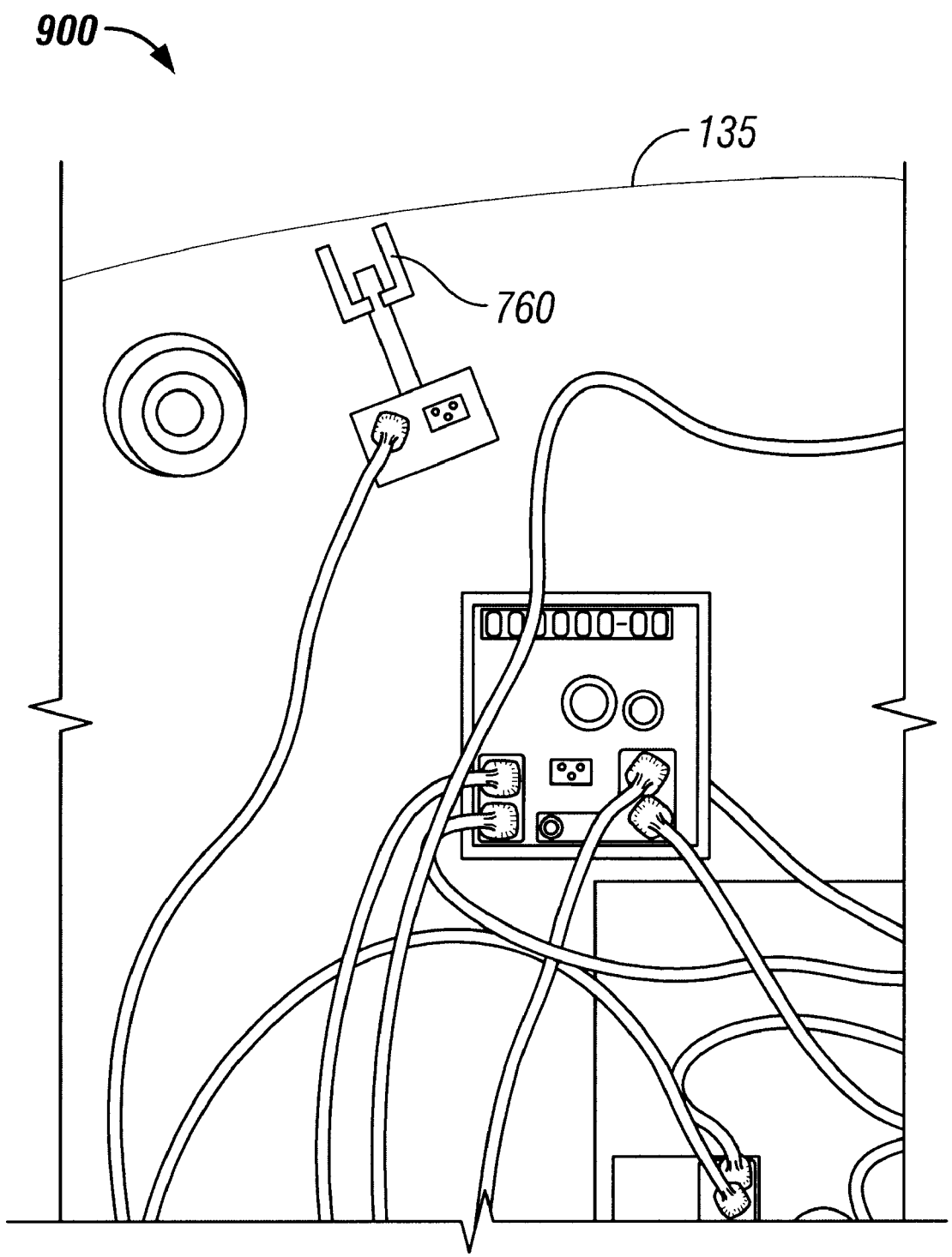
FIGS. 9–11 are perspective view of sections of the disassembled toy of FIG. 1.
Figure 10:
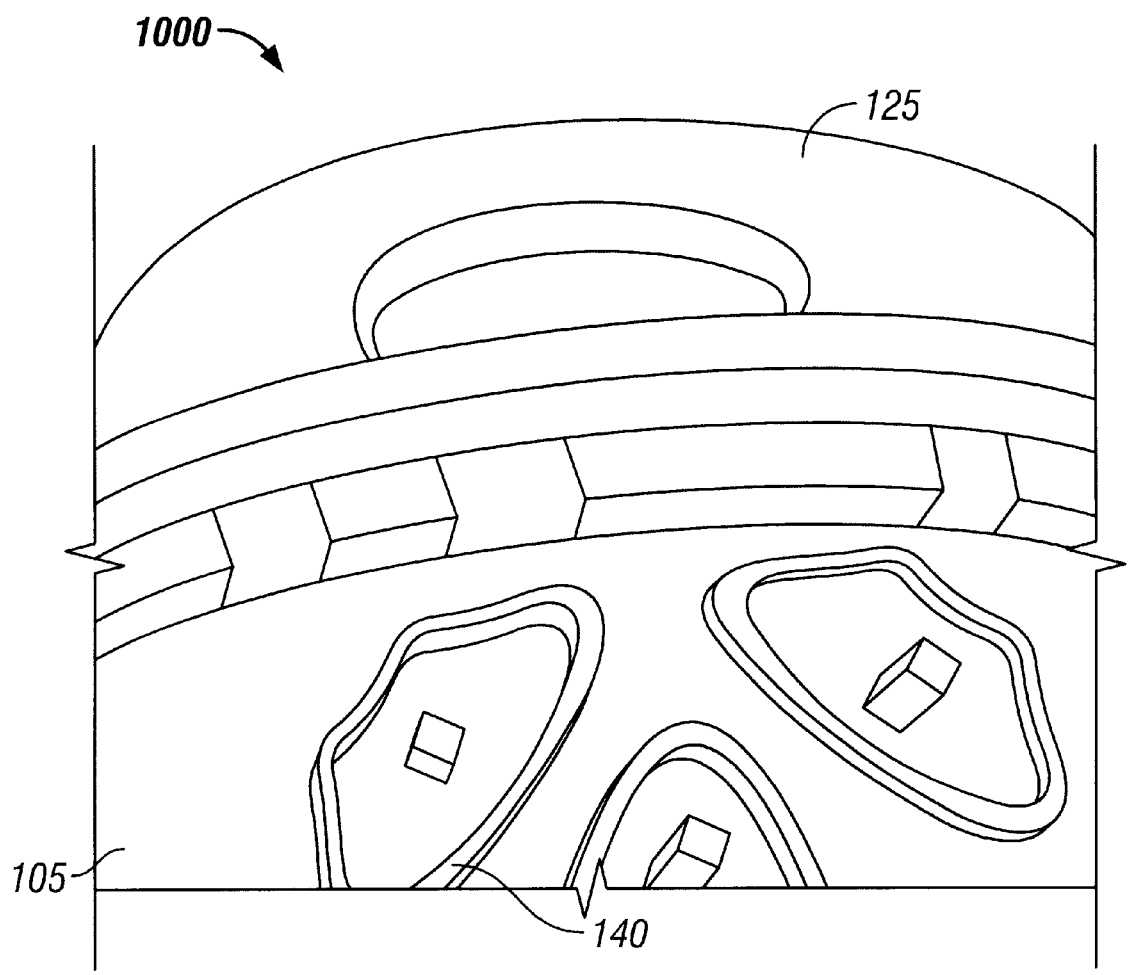
Figure 11:
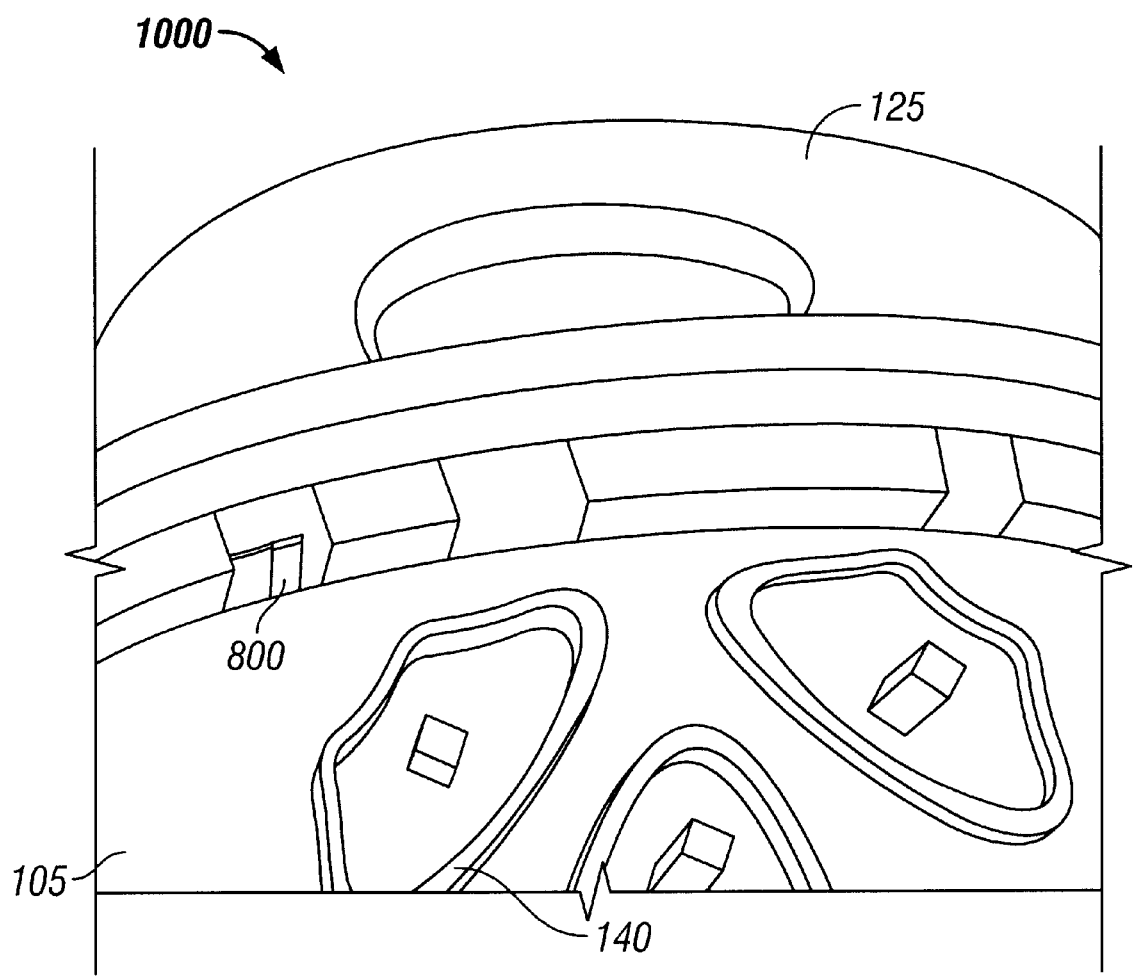

Referring also to FIGS. 9–11, the controller 720 is connected to a switch 760 mounted to the housing 105. The switch 760 indicates whether the overlay 145 (or any other overlay on the movable piece 150) is in the first area. Thus, for example, the switch 760 is activated by the overlay 145 when the overlay 145 moves into the first area. In this way, the switch 760 is used to indicate a mode of play to the controller 720. In one implementation, the flange on the movable piece 150 includes an extension 800 that engages the switch 760 when the overlay 145 is moved to the first area (as shown by section 1000 in FIG. 10) and that disengages the switch 760 when the overlay 145 is moved back to the second area (as shown by section 1000 in FIG. 11).

In general, the controller 720 is connected to the output device 115 and to the output device 700 to control operation of the devices 115, 700 upon receipt of input from the switches (including, for example, switches 725, 730, 735) connected to input devices (including, for example, devices 140, 141, 160) and to change a mode of operation based on input from switch 760.

Figure 12:
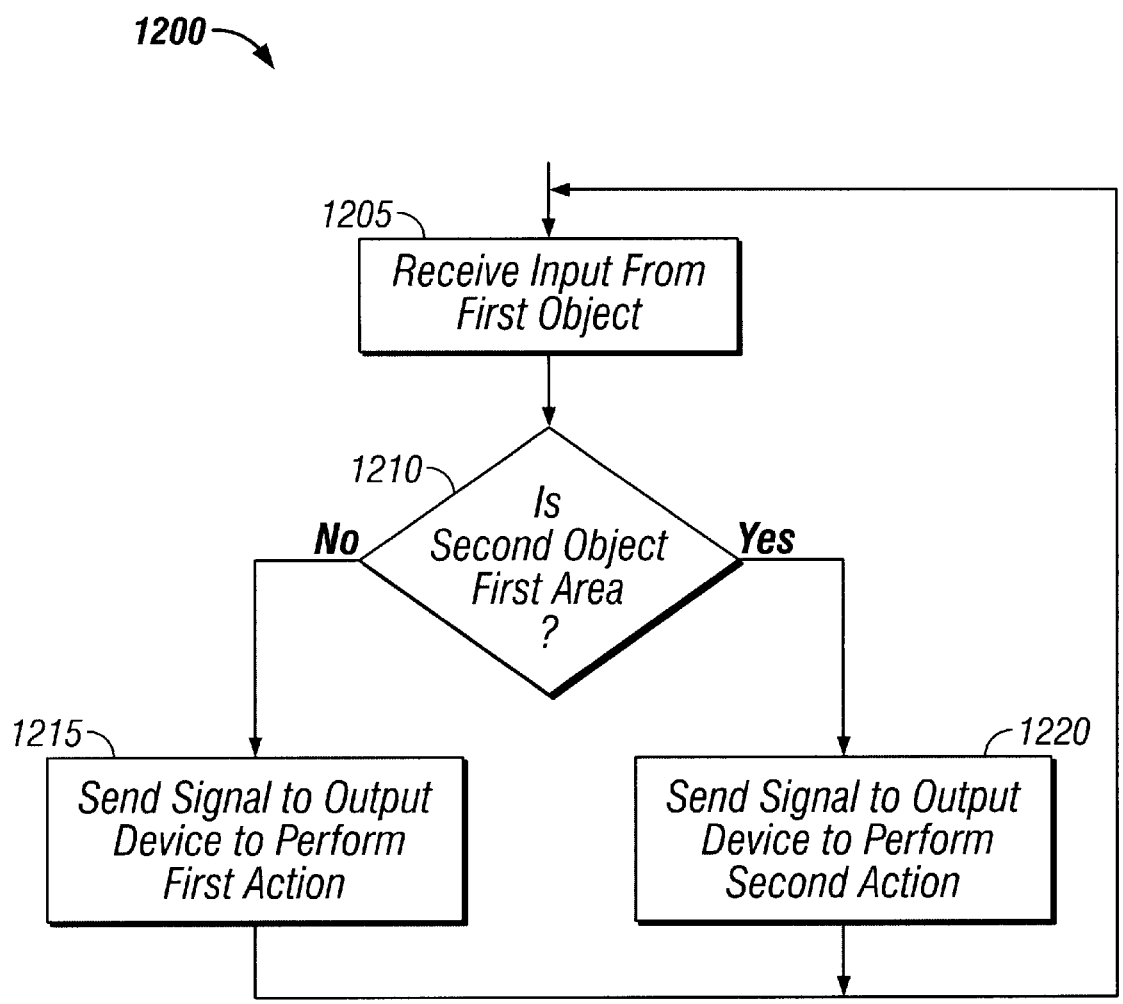
FIGS. 12 and 15 are flow charts of procedures performed by the toy of FIG. 1.

Referring also to FIG. 12, in operation, the controller 720 performs a procedure 1200 for play. Initially, the controller 720 receives input from the input device 140 by, for example, receiving input from switch 745 (step 1205). The controller 720 determines whether the overlay 145 is in the first area by, for example, determining whether the switch 760 is engaged (step 1210). The controller 720 operates under a first mode if the overlay 145 is not in the first area, that is, if the overlay 145 is disengaged from the input device 140 (step 1215). For example, the controller causes the output device 115 and/or 700 to perform a first action. The controller 720 operates under a second mode if the overlay 145 is in the first area, that is, if the overlay 145 engages the input device 140 (step 1220). For example, the controller 720 causes the output device 115 and/or 700 to perform a second action.

Figure 13:
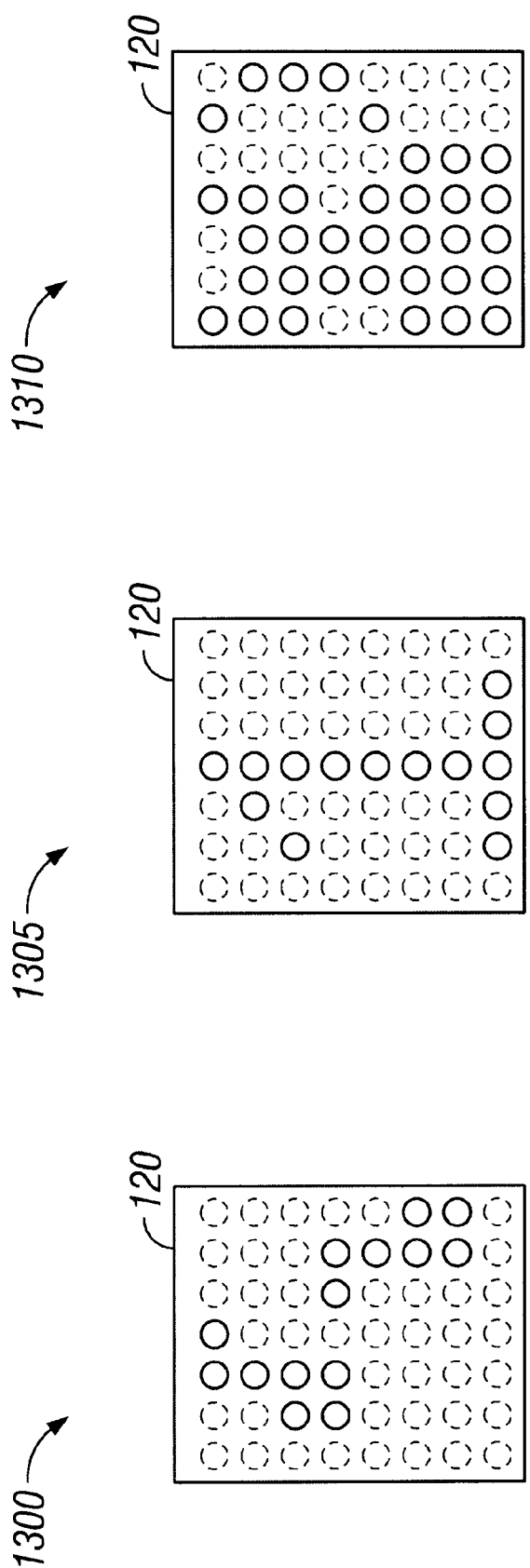
FIG. 13 shows examples of displays output from the toy of FIG. 1.

As discussed above, in one implementation, the output device 115 may include a display 120 and the output device 700 may include a speaker. Referring also to FIG. 13, for example, the overlay 145 is shaped like a musical note and the controller 720 causes the display 120 to illustrate musical notes 1300 when the overlay 145 is in the first area and the overlay 145 is pressed by the player. Furthermore, the controller 720 may cause the speaker to simultaneously play a musical note or song when the overlay 145 is in the first area and the player presses the overlay 145.

As another example, the input device 140 has a numerical illustration, so the controller 720 causes the display 120 to illustrate numbers 1305 when the overlay 145 is in the second area and the player presses the input device 140. Additionally, the controller 720 also may cause the speaker to simultaneously play a voice reciting one or more numbers.

As another example, the overlay 146 is shaped and illustrated like a cat, so the controller 720 causes the display 120 to illustrate a cat 1310 when the overlay 146 is in the first area and the player presses the overlay 146. Furthermore, the controller 720 may cause the speaker to simultaneously play a cat sound, such as, for example, a "meow." In another implementation, the controller 720 may begin a special game if the player presses the overlay 146 while the controller 720 is operating in the second mode. For example, the controller 720 may cause the speaker to play "copycat" and then engage the player in a memory game if the player presses the overlay 146 and if the controller is operating in the second mode.

Figure 14:
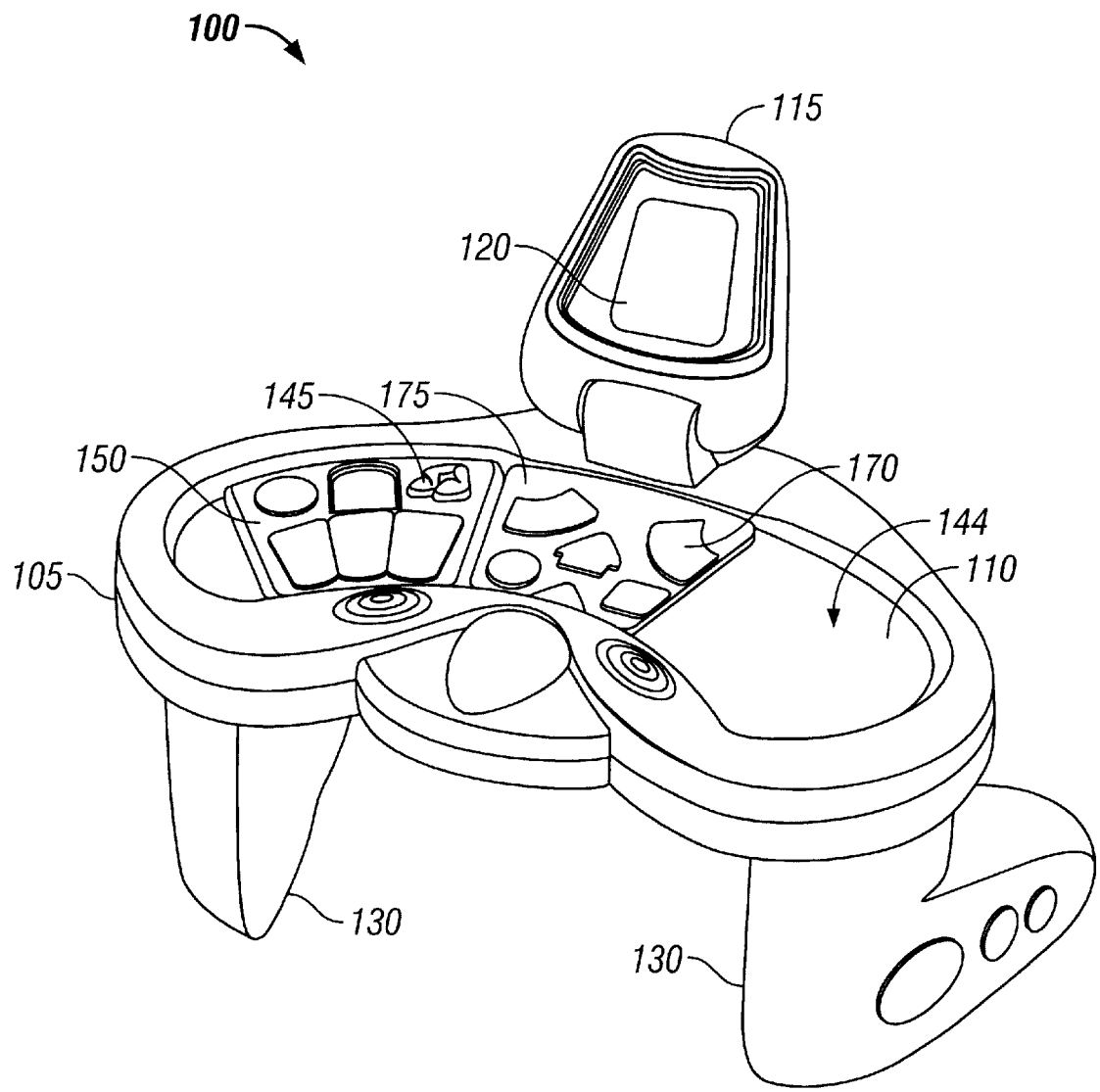
FIG. 14 is a perspective front view of the toy of FIG. 1.

Referring again to FIGS. 1, 5, 8, and also to FIG. 14, the toy 100 may include a second overlay 170 attached to the surface 110 to move relative to the surface 110 from a third area 144 to the first area 142. The overlay 170 receives input from the player. When the overlay 170 is in the third area, the input device 140 is disengaged from the overlay 170 such that input received by the overlay 170 does not provide input to the input device 140. When the overlay 170 is in the first area, the input device 140 is engaged by the overlay 170 such that input received by the overlay 170 provides input to the input device 140. The overlay 170 matches or lines up with the input device 140 when the overlay 170 is in the first area.

Like the overlay 145, the overlay 170 may include, for example, a spring-loaded button having an extension such as a post. In this case, the post is positioned to contact the input device 140 when the player presses the overlay 170 when it is in the first area. Other designs and implementations of the overlay 170 and its engagement with the input device 140 are discussed above with respect to overlay 145.

The overlay 170 may be formed as a button having characteristics, such as, for example, shape, color, and illustration, that correlate to the actions produced by the output device 115 or 700 when the input device 140 receives input from the overlay 170. In this case, the overlay 170 includes an illustration of chicks. Thus, for example, the output device 115 may display an illustration of a chick and/or the output device 700 may play sounds that chicks make when the input device 140 receives input from the overlay 170.

The overlay 170 may be attached to a movable piece 175. Like the movable piece 150, the movable piece 175 is engaged by the housing 105 to slide along the surface 110. The movable piece 175 may include one or more flanges that engage the slots or tracks 155.

Additionally, the toy 100 may include several other second overlays of different shapes, with each second overlay matching or lining up with a corresponding input device when that second overlay is moved to the first area from the third area. For example, an to overlay 180 includes an illustration of a mother with a child and the overlay 180 lines up with and engages the input device 141 when the overlay 180 is in the first area.

The controller 720 is also connected to a switch 765 mounted to the housing 105, the switch 765 indicating whether the overlay 170 is in the first area. The switch 765 is activated by the overlay 170 when the overlay 170 moves into the first area. As discussed above with respect to switch 760, in one implementation, the flange on the movable piece 175 includes an extension 805 that engages the switch 765 when the overlay 170 is moved to the first area.

The extension 805 disengages the switch 765 when the overlay 170 is moved back to the third area.

Figure 15:
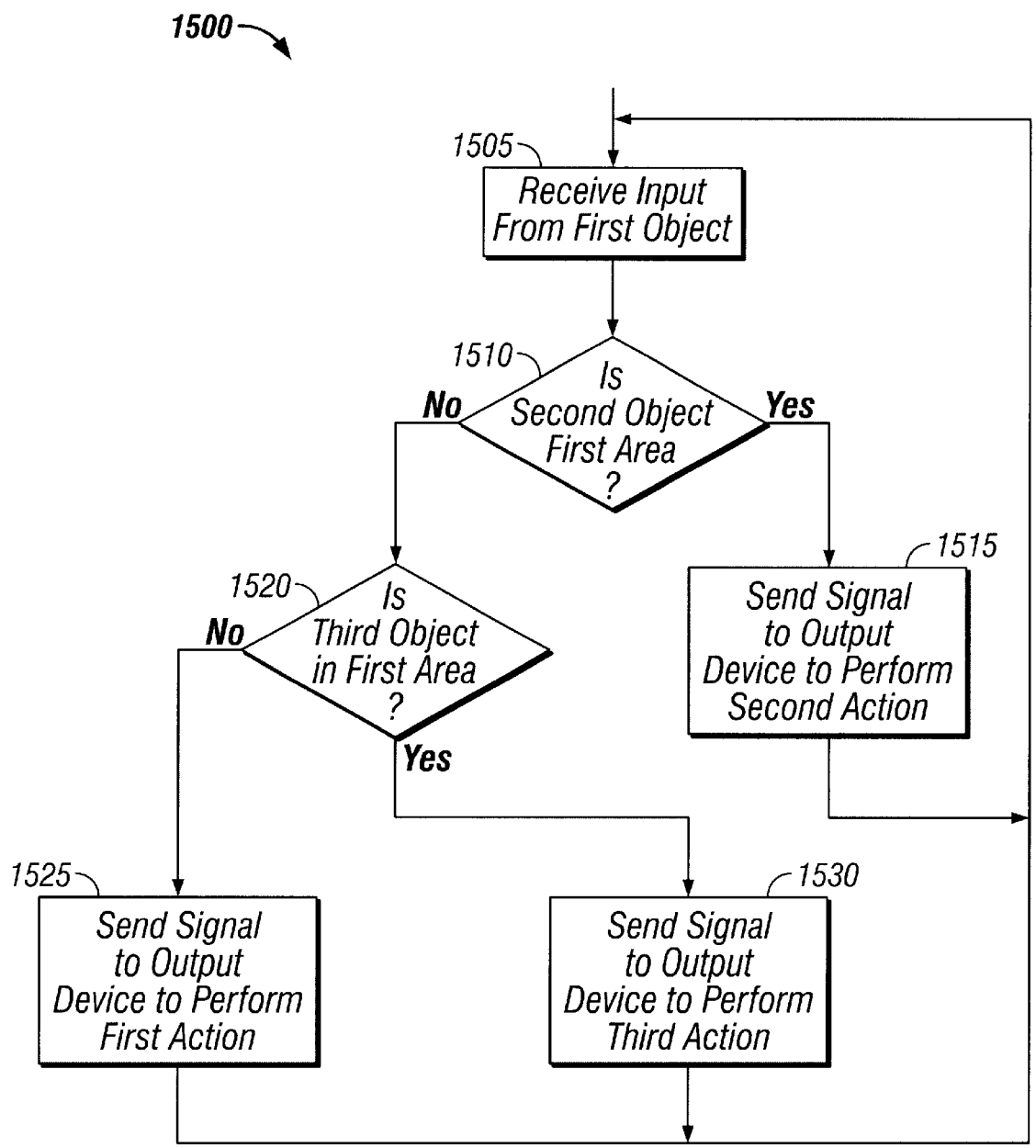

Like the switch 760, the switch 765 also indicates a mode of play of the controller 720. Referring also to FIG. 15, in another implementation, the controller 720 performs a procedure 1500 for play. Initially, the controller 720 receives input from the input device 140 by, for example, receiving input from the switch 745 (step 1505). The controller 720 determines whether the overlay 145 is in the first area by, for example, determining whether the switch 760 is engaged (step 1510). The controller 720 operates under the second mode if the overlay 145 is in the first area, that is, if the overlay 145 engages the input device 140 (step 1515). For example, the controller 720 causes the output device 115 and/or 700 to perform a second action.

If the overlay 145 is not in the first area (step 1510), the controller 720 determines whether the overlay 170 is in the first area by, for example, determining whether the switch 765 is engaged (step 1520). If the overlay 170 is not in the first area, that is, if the overlay 170 is disengaged from the input device 140, then the controller 720 operates in the first mode (step 1525). For example, the controller 720 causes the output device 115 and/or 700 to perform a first action. If the overlay 170 is in the first area, that is, if the overlay 170 is engaging the input device 140, then the controller 720 operates under a third mode (step 1530). For example, the controller 720 causes the output device 115 and/or 700 to perform a third action.

Generally, if the controller 720 receives input from the input device 160 by, for example, receiving input from the switch 755, the controller 720 performs an action that depends on the mode. Thus, the controller 720 may determine whether the overlay 145 or the overlay 170 is in the first area to determine the mode.

Other implementations are within the scope of the following claims. For example, the movable piece 150 and/or 175 may include an extension that protrudes from one of the ledges. The housing 105 may include ribs that are positioned near the slot 155 through which the extension passes. In this way, when the movable piece 150 and/or 175 is moved across the surface 110, the extension engages the ribs to cause clicking sounds.

If the controller 720 receives input from the input device 160, the controller 720 may perform an action independently of the mode of play.

Figure 16A:
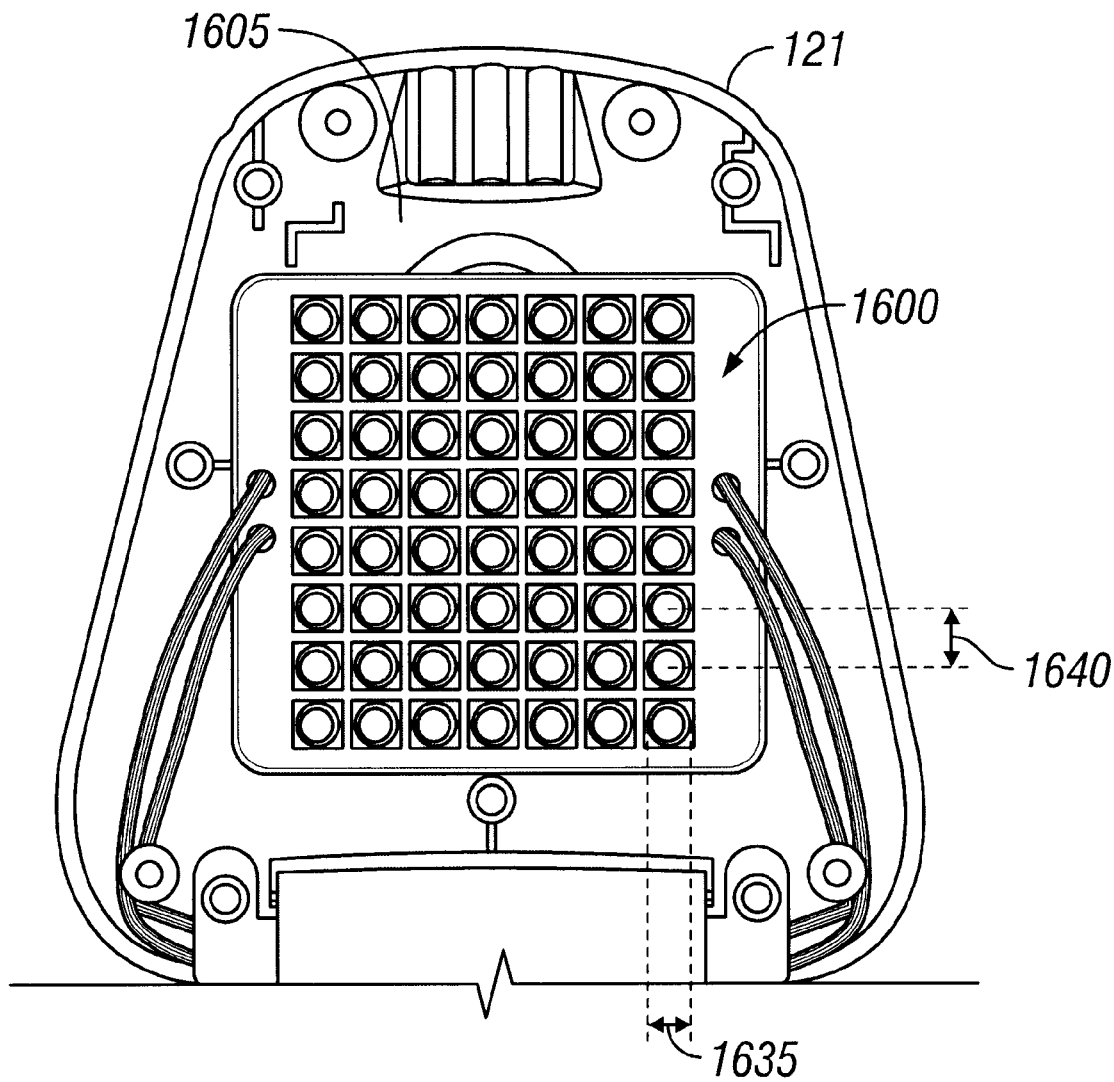
FIGS. 16A–16F are perspective front views of assembly of an output device of the toy of FIG. 1.
Figure 16B:
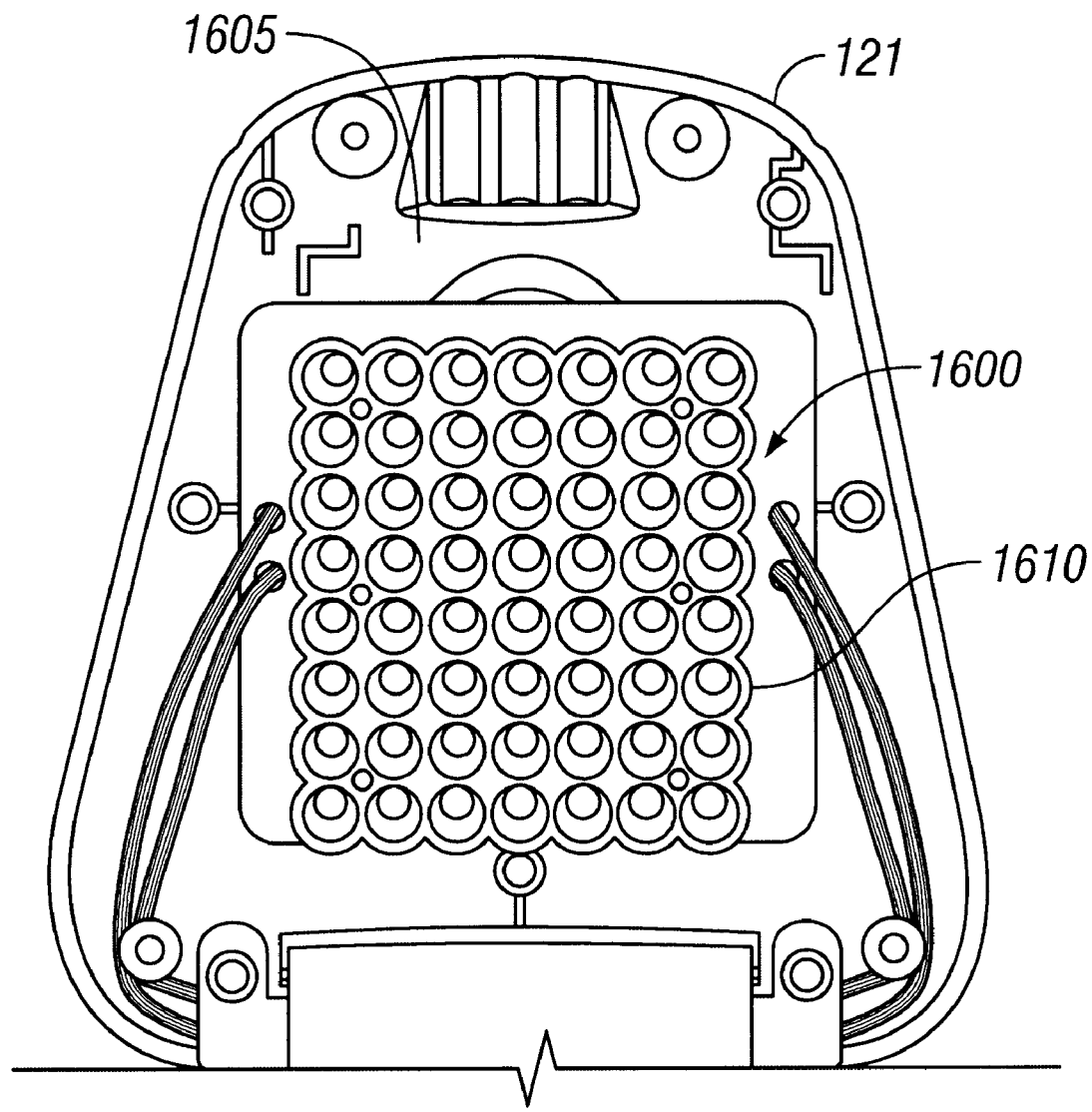
Figure 16C:
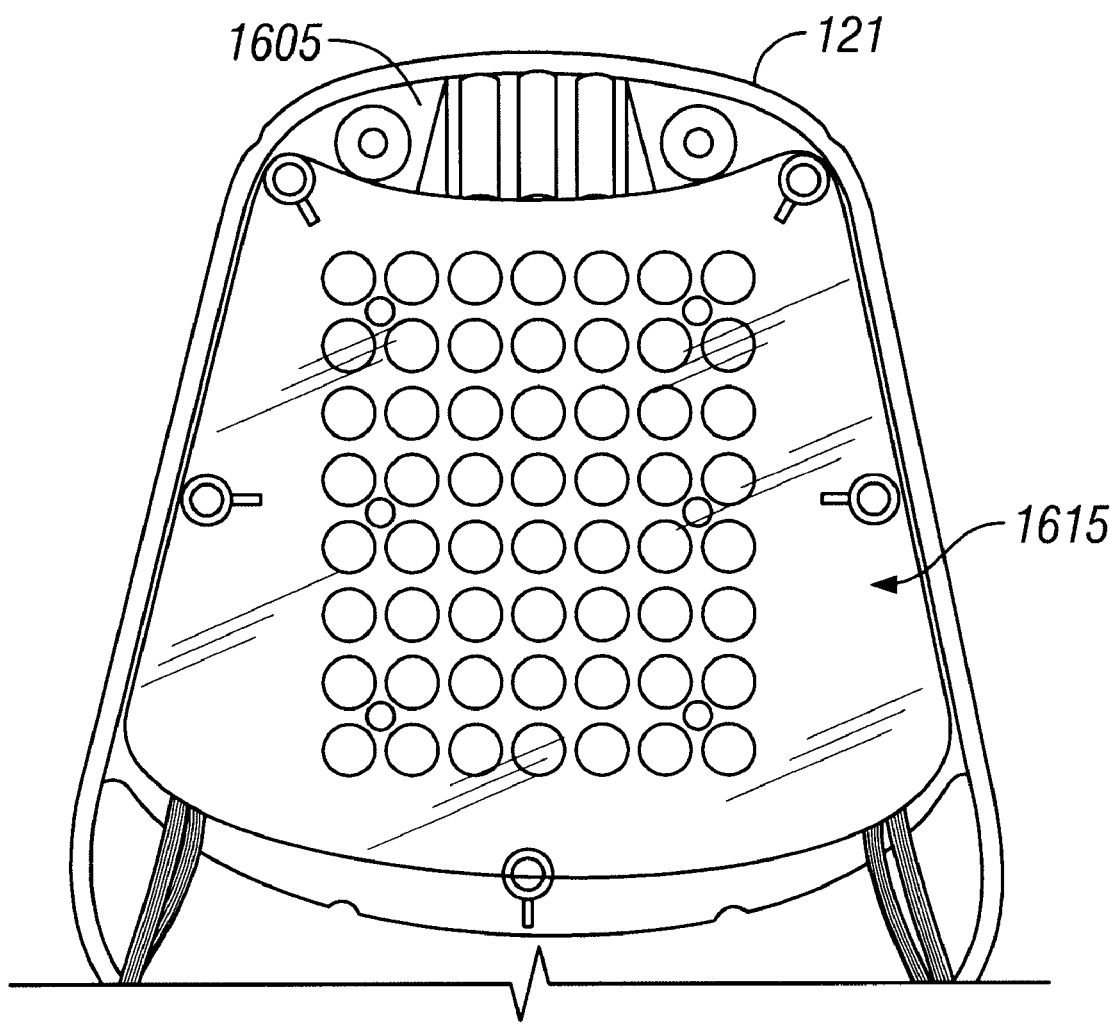
Figure 16D:
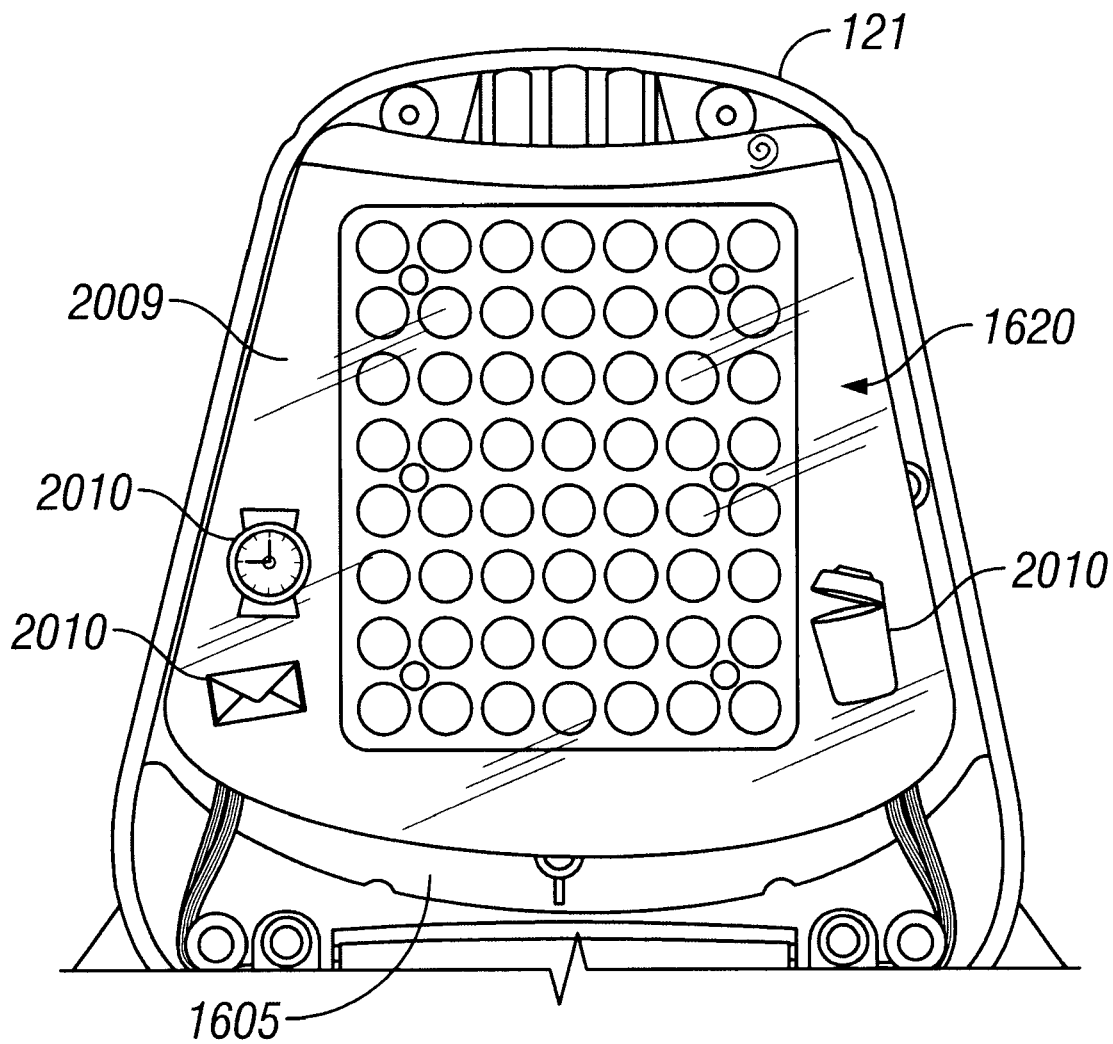
Figure 16E:
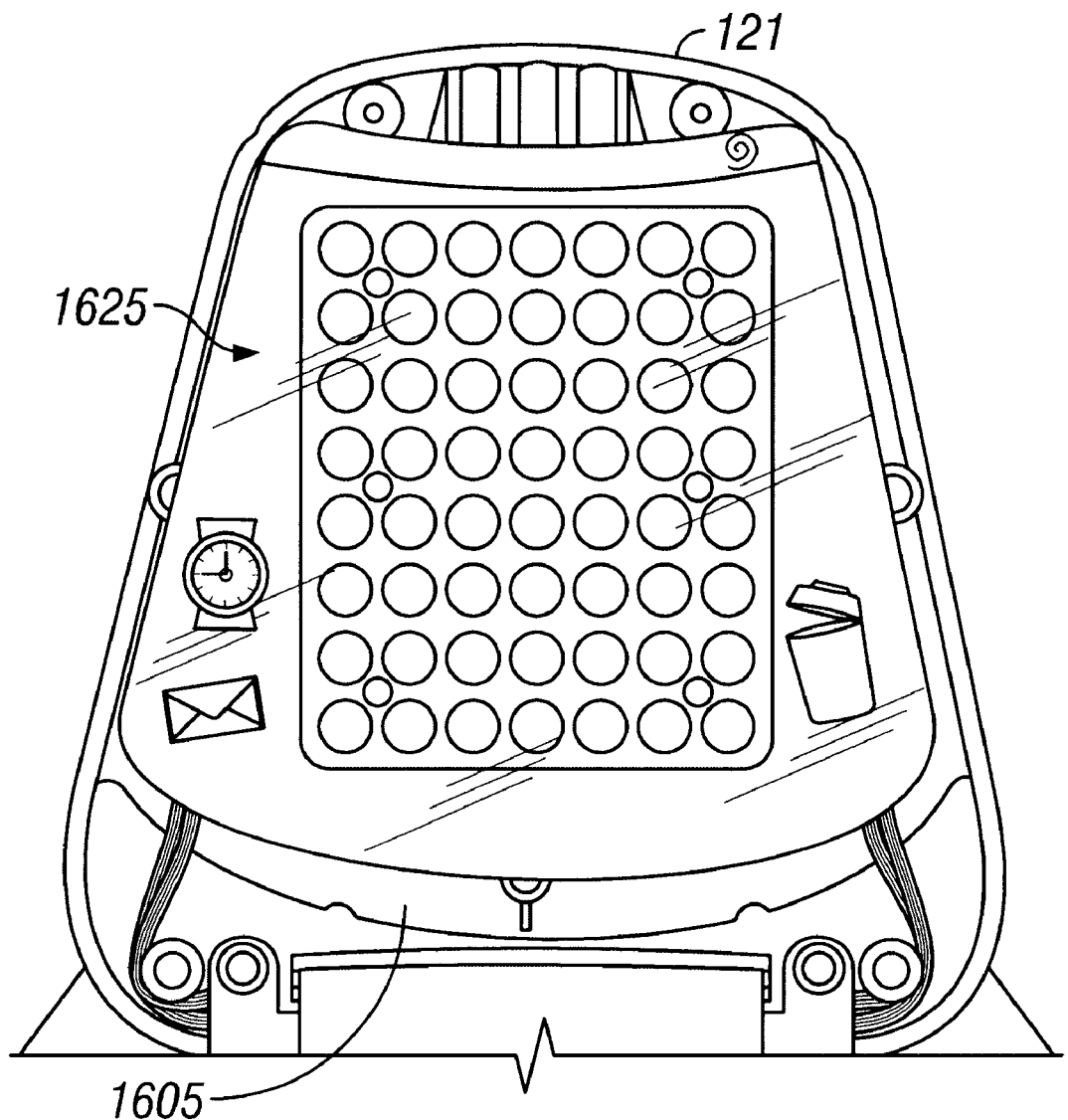
Figure 16F:
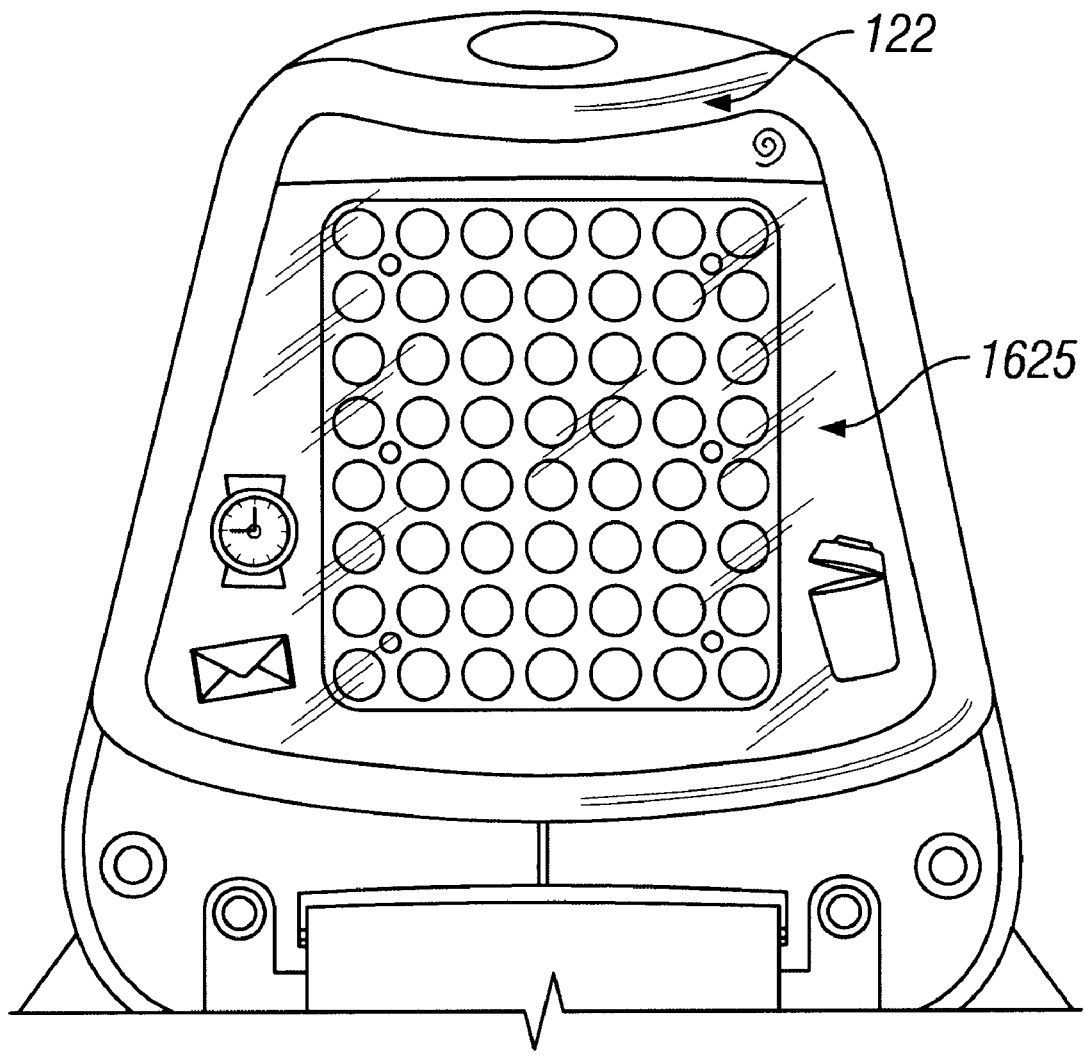

Referring also to FIGS. 16A–16F, in one implementation, the output device 115 includes an array of light sources 1600 (FIG. 16A), such as light emitting diodes (LEDs), arranged within a cavity 1605 formed by the base piece 121 and the frame piece 122. Additionally, the output device 115 includes a grid 1610 (FIG. 16B), a first diffuser 1615 (FIG. 16C), a second diffuser 1620 (FIG. 16D), a shield 1625 (FIG. 16E), and the frame piece 122 (FIG. 16F). The components 1600, 1610, 1615, 1620, and 1625 are situated within the cavity 1605 to improve illuminated animations as detailed below.

Figure 17:
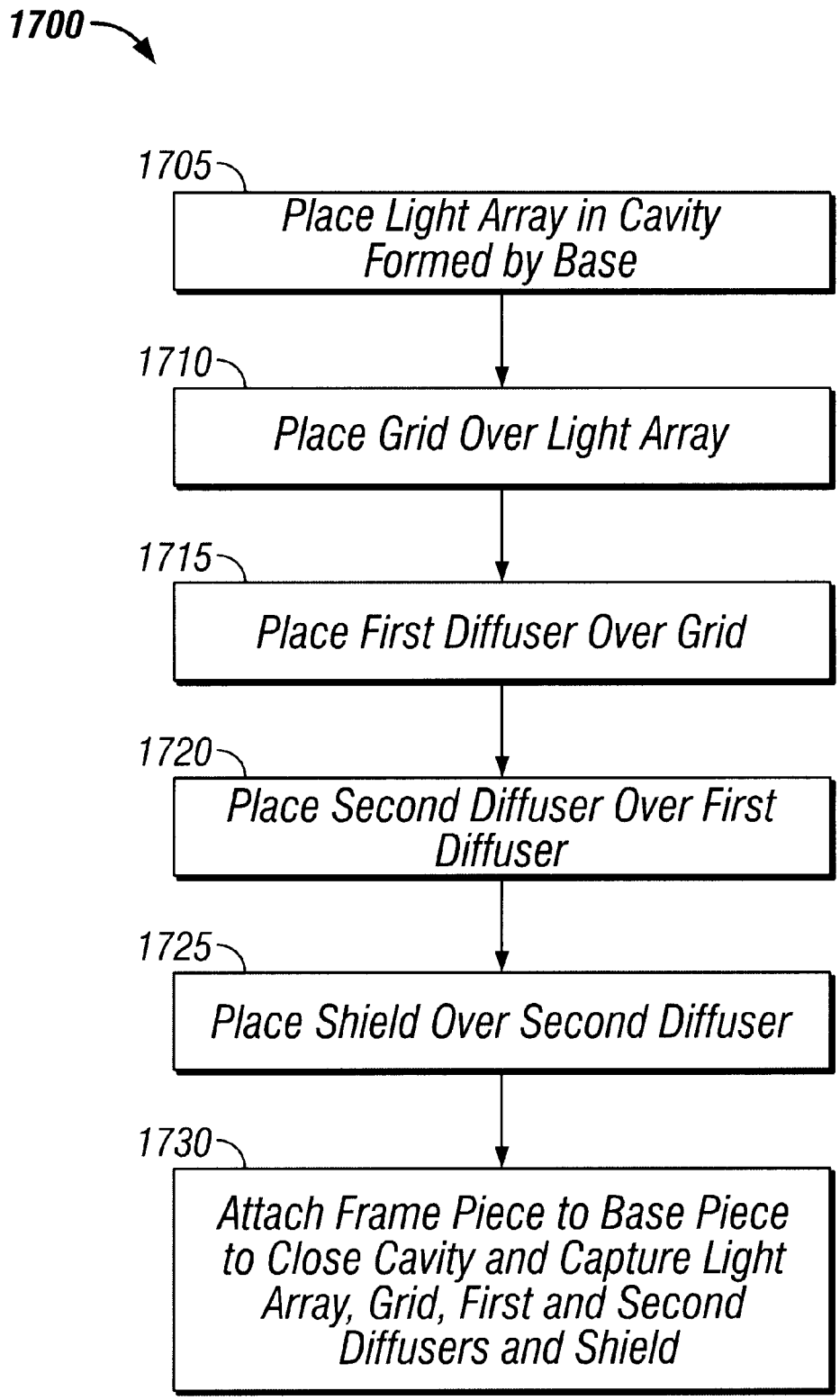
FIG. 17 is a flow chart of a procedure for assembling the output device of FIGS. 16A–16F.

Referring also to FIG. 17, in this implementation, a procedure 1700 is performed when assembling the output device 115. The array 1600 is placed in the cavity 1605 (step 1705). As shown in FIG. 16A, the array 1600 includes light sources 1630 arranged and separated to resemble an array. In one implementation, each light source 1630 has a width 1635 of 5 millimeters (mm) and is separated from an adjacent light source by a distance 1640 of 10 mm.

Figure 18:
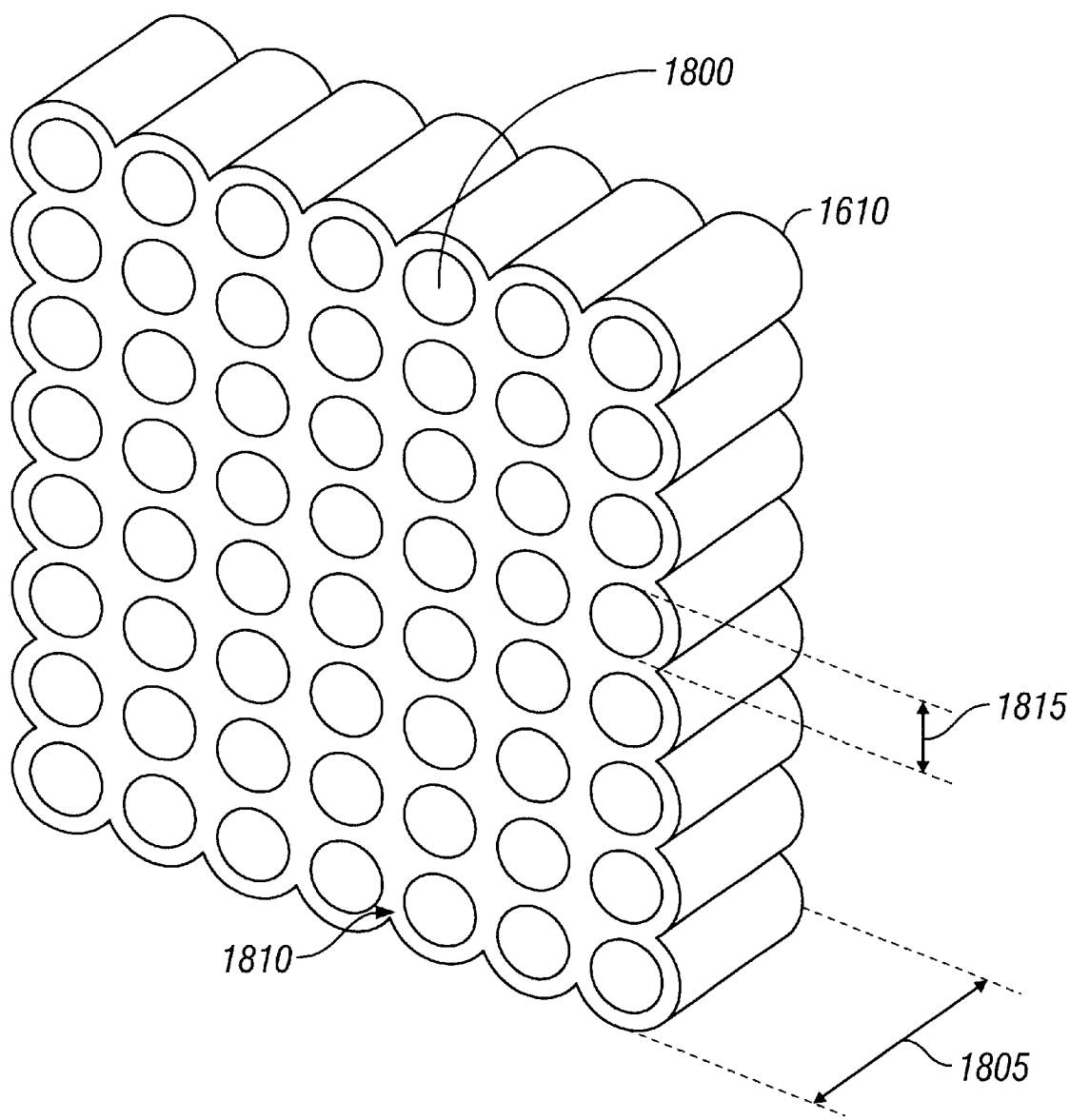
FIG. 18 is a side perspective view of a grid used in the output device of FIGS. 16A–16F.
Figure 19:
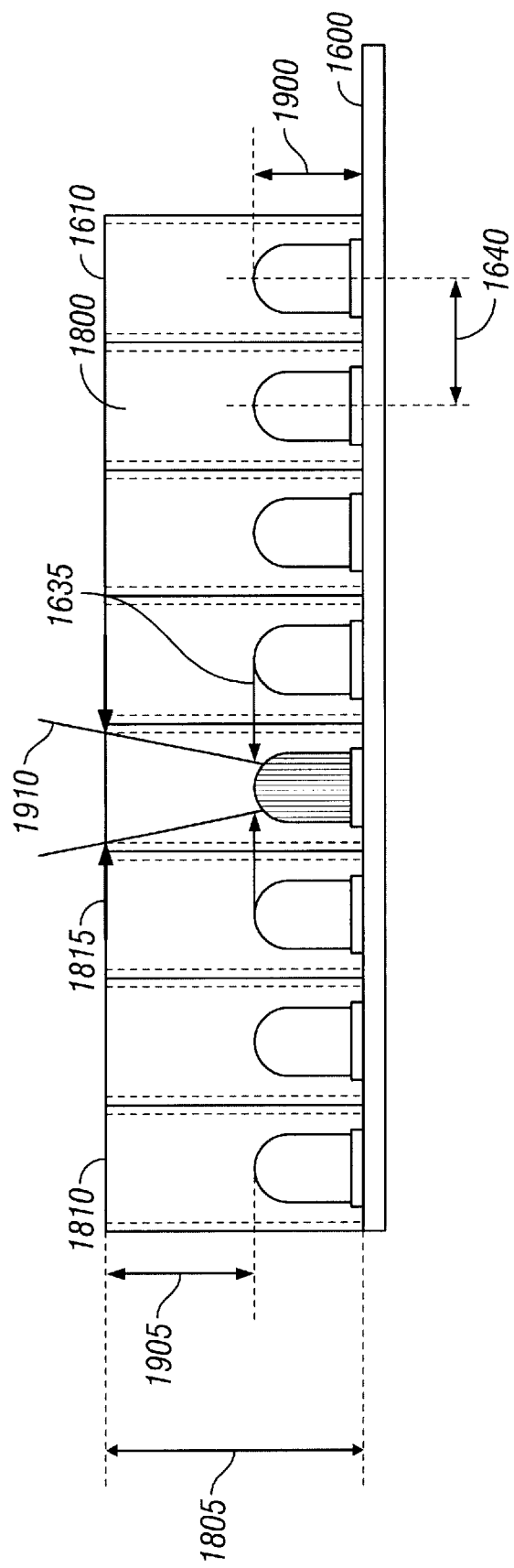
FIG. 19 is a side cross sectional view of the grid over an array of light sources used in the output device of FIGS. 16A–16F.

The grid 1610 is placed over the array 1600 (step 1710). As shown in FIGS. 16B, 18, and 19, the grid 1610 is made of an array of tubular holes 1800 that are positioned to accept the light sources 1630 in the array 1600 when the grid 1610 is placed over the array 1600. The grid 1610 maybe made of rigid plastic. The inside surface of each of the holes 1800 has a white color and one or more outer surfaces of the grid 1610 may be formed of any suitable color to mask the appearance of the grid 1610 when the device 115 is assembled. Thus, for example, if the second diffuser 1620 has a teal color, then the outer surface of the grid 1610 facing the second diffuser 1620 may have a teal color.

The grid 1610 has a thickness 1805 that is greater than a height 1900 of the light sources 1630 such that a space 1905 is formed between the edge of the light sources 1630 and a surface 1810 of the grid 1610. Each of the holes 1800 in the grid 1610 has a width 1815 for receiving the light source 1630 when the grid 1610 is placed over the array 1600. Thus, the width 1815 of a hole must be greater than the width 1635 of the light source 1630 it receives. In the implementation discussed, if the width 1635 is 5 mm, the width 1815 may be 8 mm and the thickness 1805 may be 19.5 mm. If the height 1900 of each of the light sources 1630 is 7.5 mm, then the space 1905 is 12 mm.

The grid 1610 serves to space the light sources 1630 back from the first diffuser 1615 (or any other screen that may be placed over the grid 1610). In this way, the area of light projected from each of the light sources 1630 (shown in FIG. 19 as a cone 1910 of light) against the first diffuser 1615 is enlarged beyond the width 1635 of that light source 1630. This occurs because the first diffuser 1615 intersects at a larger cross section of the cone 1910. Additionally, the grid 1610 serves to contain or capture the light projected from the light sources 1630 because the light travels through the holes 1800. Because the inner surfaces of the holes 1800 are white, the grid 1610 serves to reflect light from the light sources 1630 within the holes 1800, thus collecting more light from the light sources 1630.

Referring again to FIGS. 16C and 17, the first diffuser 1615 is placed over the grid 1610 (step 1715). The first diffuser 1615 is a thin sheet of a translucent, milky colored acetate. The first diffuser 1615 diffuses the light emitted from the light sources 1630, thus eliminating hot spots. Additionally, the first diffuser 1615 forces the light emitted from the light sources 1630 to its outer surface so that light may be seen on the first diffuser 1615 regardless of the angle of the first diffuser 1615 to a viewer. Moreover, because the first diffuser 1615 is milky and translucent, the first diffuser 1615 serves to mask the light sources 1630 so that they are not seen by the viewer. In this way, the output device 115 looks more like a computer monitor.

Figure 20:
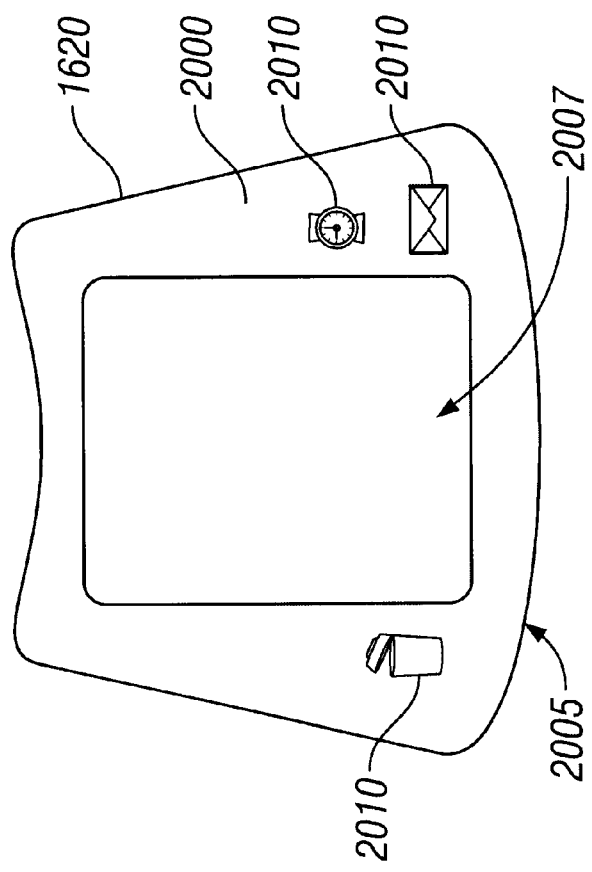
FIG. 20 shows side views of a diffuser used in the output device of FIGS. 16A–16F.
Figure 20:
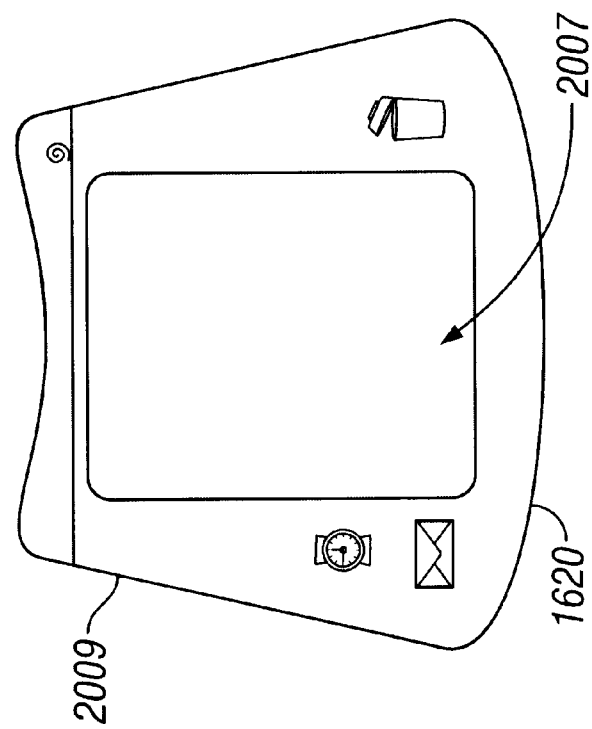

Referring again to FIG. 16D and also to FIG. 20, a second diffuser 1620 may be placed over the first diffuser 1615 (step 1720). The second diffuser 1620 may be made of an acetate sheet that is lightly textured to provide additional diffusion of the light emitted from the light sources 1630. The second diffuser 1620 may be printed on an inner surface 2000 with transparent inks and with an opaque coating 2005 in areas outside of a transparent area 2007 (that covers the grid 1610) where transparency is not needed. In this way, an exposed surface 2009 of the second diffuser 1620 has the appearance of a computer monitor. The surface 2000 of the second diffuser 1620 also may be printed with designs 2010 that add to enjoyment of the toy 100.

Referring again to FIG. 16E, the shield 1625 may be placed over the second diffuser 1620 (step 1725) to protect the assembly of the array 1600, the grid 1610, the first diffuser 1615, and the second diffuser 1620 beneath. Referring again to FIG. 16F, the frame piece 122 may be attached to the base piece 121 to close the cavity 1605 and to capture the array 1600, grid 1610, the first diffuser 1615, the second diffuser 1620, and the shield 1625 (step 1730). The frame piece 122 may be decorated as shown to further add to enjoyment of the toy 100.

What is claimed is:

1. A toy comprising:
   a housing having a surface;
   an output device mounted to the housing;
   an input device mounted in a first area on the surface to receive input;
   an overlay mounted on the surface to receive input and to move relative to the surface from a second area to the first area such that the overlay is disengaged from the input device when the overlay is in the second area and the overlay engages the input device when the overlay is in the first area; and
   a controller connected to the input device and to the output device to control the output device to perform a first action when the input device receives input and the overlay is in the second area and to perform a second action when the input device receives input and the overlay is in the first area.

2. The toy of claim 1 further comprising a switch mounted to the housing and engaged by the overlay when the overlay is in the first area.

3. The toy of claim 2 in which the switch is connected to the controller to indicate whether the overlay is in the first area.

4. The toy of claim 1 in which the output device comprises a display.

5. The toy of claim 1 in which the input device comprises a button.

6. The toy of claim 1 in which the overlay comprises a button.

7. The toy of claim 1 further comprising another output device mounted to the housing and connected to the controller.

8. The toy of claim 1 in which the input device includes a physical characteristic and the overlay includes a physical characteristic such that the first action relates to the physical characteristic of the input device and the second action relates to the physical characteristic of the overlay.

9. The toy of claim 1 further comprising a second overlay mounted on the surface to receive input and to move relative to the surface from a third area in which the second overlay is disengaged from the input device to the first area in which the second overlay is engaged with the input device to provide input to the input device when the second overlay receives input.

10. The toy of claim 9 in which the controller controls the output device to perform a third action when the second overlay receives input and the second overlay is in the first area.

11. The toy of claim 9 further comprising a second switch mounted to the housing and engaged by the second overlay when the second overlay is in the first area.

12. The toy of claim 11 in which the other switch is connected to the controller to indicate whether the second overlay is in the first area.

13. The toy of claim 9 in which the second overlay comprises a button.

14. The toy of claim 9 in which the second overlay includes a physical characteristic such that the third action relates to the physical characteristic of the second overlay.

15. The toy of claim 1 further comprising another input device mounted to the housing, the other input device being disengaged from the overlay independently of whether the overlay is in the first area;
   in which the controller is connected to the other input device to receive input from the other input device, to cause the output device to perform a fourth action when the other input device receives input and the overlay is in the second area, and to cause the output device to perform a fifth action when the other input device receives input and the overlay is in the first area.

16. The toy of claim 1 in which the output device comprises:
   an array of light sources;
   a grid placed over the array, the grid comprising an array of tubular holes, each hole aligning with a light source when the grid is placed over the array; and
   a diffuser placed over the grid to collect light emitted from the light sources.

17. The toy of claim 16 in which the grid is made of a rigid plastic material.

18. The toy of claim 16 in which each of the holes has a white surface.

19. The toy of claim 16 in which the grid has a thickness that is greater than a height of the array such that an area of light projected from the array and onto the diffuser is enlarged.

20. The toy of claim 16 in which the diffuser diffuses light emitted from the light sources.

21. The toy of claim 16 in which the diffuser masks the light sources.

22. The toy of claim 21 in which the diffuser is made of an acetate material.

23. The toy of claim 21 in which the diffuser includes at least a portion covered with an opaque coating.

24. The toy of claim 16 in which the diffuser is made of a milky and translucent material.

25. A method of controlling an electronic learning toy that includes a housing having a surface and an output device mounted to the housing, the method comprising:
   providing an input device mounted on the surface at a first area;
   providing an overlay mounted on the surface to move relative to the surface from a second area in which the overlay is disengaged from the input device to the first area in which the input device is engaged by the overlay;

receiving input from the input device;

determining whether the overlay is in the first area;

if the overlay is not in the first area, sending a signal to the output device to perform a first action; and if the overlay is in the first area, sending a signal to the output device to perform a second action.

26. The method of claim 25 in which determining whether the overlay is in the first area comprises receiving an indication of whether the overlay is in the first area from a switch mounted to the housing and engaged by the overlay when the overlay is in the first area.

27. The method of claim 25 in which the output device comprises a display.

28. The method of claim 25 in which the input device comprises a button.

29. The method of claim 25 in which the overlay comprises a button.

30. The method of claim 25 further comprising:

providing a second overlay mounted on the surface to move relative to the surface from a third area in which the second overlay is disengaged from the input device to the first area in which the input device is engaged by the second overlay;

determining whether the second overlay is in the first area;

if the second overlay is in the first area, sending a signal to the output device to perform a third action; and if neither the overlay nor the second overlay is in the first area, sending a signal to the output device to perform the first action.

31. The method of claim 30 in which determining whether the second overlay is in the first area comprises receiving an indication of whether the second overlay is in the first area from a second switch mounted to the housing and engaged by the second overlay when the second overlay is in the first area.

32. The method of claim 30 in which the second overlay comprises a button.

33. A toy comprising:

a housing having a surface;

an output device mounted to the housing;

an input device mounted in a first area on the surface;

an overlay mounted on the surface to move relative to the surface from a second area to the first area; and a controller connected to the input device to operate on the output device in a first mode when the overlay is in the second area and the input device receives input, and to operate on the output device in a second mode when the overlay is in the first area and the input device receives input.

34. The toy of claim 33 further comprising another input device mounted to the housing, the other input device being disengaged from the overlay independently of whether the overlay is in the first area;

in which the controller is connected to the other input device to operate on the output device in the first mode when the overlay is in the second area and the other input device receives input, and to operate on the output device in the second mode when the overlay is in the first area and the other input device receives input.

* * * * *